: US 11,493,698 B2
(45) Date of Patent: Nov. 8, 2022

(12) United States Patent
Ishiguro

(54) OPTICAL CONNECTOR-INCORPORATING PLUG MANUFACTURING METHOD AND OPTICAL CONNECTOR-INCORPORATING PLUG

(71) Applicant: Japan Aviation Electronics Industry, Limited, Tokyo (JP)

(72) Inventor: Masaki Ishiguro, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 17/174,508

(22) Filed: Feb. 12, 2021

(65) Prior Publication Data

US 2021/0333482 A1 Oct. 28, 2021

(30) Foreign Application Priority Data

Apr. 28, 2020 (JP) .............................. JP2020-079677

(51) Int. Cl.
G02B 6/38 (2006.01)
G02B 6/42 (2006.01)

(52) U.S. Cl.
CPC ......... *G02B 6/3869* (2013.01); *G02B 6/3849* (2013.01); *G02B 6/4292* (2013.01); *G02B 6/4256* (2013.01)

(58) Field of Classification Search
CPC .. G02B 6/3802; G02B 6/3821; G02B 6/3849; G02B 6/3857; G02B 6/3869; G02B 6/3874; G02B 6/3887; G02B 6/3891; G02B 6/4251; G02B 6/4262; G02B 6/4292
USPC .................................................. 385/53, 139
See application file for complete search history.

(56) References Cited

U.S. PATENT DOCUMENTS

| 10,067,300 B2 | 9/2018 | Katagiyama et al. |
| 10,254,489 B2* | 4/2019 | Carneiro ............... G02B 6/3887 |
| 2011/0211792 A1* | 9/2011 | Koreeda ............... G02B 6/3879 |
| | | 385/60 |
| 2017/0276882 A1* | 9/2017 | Koreeda .................. G02B 6/42 |

FOREIGN PATENT DOCUMENTS

JP 2016122050 A 7/2016

OTHER PUBLICATIONS

European Search Report dated Aug. 2, 2021 in EP Application No. 21156121.2, 8 pages.

* cited by examiner

*Primary Examiner* — Michael P Mooney
(74) *Attorney, Agent, or Firm* — Muncy, Geissler, Olds & Lowe, P.C.

(57) ABSTRACT

There is provided an optical connector-incorporating plug properly assembled such that an optical fiber taken out from an end portion of an optical cable can have a fixed length. The optical connector-incorporating plug of the invention includes: a cable insertion component having an insertion hole in which an optical cable is inserted with an optical fiber being taken out from a cable end portion of the optical cable; a tubular member in which the cable end portion and the optical fiber are placed and in which the cable insertion component is fitted; a hole formed at a peripheral wall of the tubular member to check at least one of the cable end portion and the optical fiber in the tubular member; and a surrounding member mounted to the tubular member to surround the portion of the tubular member where the cable insertion component is fitted, thereby covering the hole.

9 Claims, 22 Drawing Sheets

OPTICAL CONNECTOR-INCORPORATING PLUG MANUFACTURING METHOD AND OPTICAL CONNECTOR-INCORPORATING PLUG

BACKGROUND OF THE INVENTION

The present invention relates to a method of manufacturing an optical connector-incorporating plug, particularly to an optical connector-incorporating plug manufacturing method involving a step of taking out an optical fiber from an end portion of an optical cable and placing the optical fiber and the cable end portion in a tubular member.

The present invention also relates to an optical connector-incorporating plug manufactured by the method.

BACKGROUND ART

One example of conventional optical connector-incorporating plugs is an optical connector-incorporating plug 1 having the structure shown in FIG. 22 (see JP 2016-122050 A). The optical connector-incorporating plug 1 has an outer shell member 2 of tubular shape. In the outer shell member 2, there are disposed an inner housing 4 that holds a connector 3, and a spring 5 that urges the inner housing 4 in a connector insertion direction. A tubular stopper 6 is inserted in a rear end opening of the outer shell member 2 to sandwich the spring 5 with the inner housing 4. The connector 3 is connected with an optical fiber 7A taken out from an end portion of an optical cable 7.

The optical fiber 7A taken out from the end portion of the optical cable 7 is passed through an insertion hole of a bushing 8 and then through the stopper 6 to be introduced into the outer shell member 2. The bushing 8 is fitted in a rear end opening of the stopper 6, and a gland nut 9 is screwed on and attached to the stopper 6. Together with the bushing 8 compressed by the screwing of the gland nut 9, the optical cable 7 is fixed with respect to the stopper 6 and the outer shell member 2.

CITATION LIST

Summary of Invention

When the optical connector-incorporating plug 1 is assembled, the optical cable 7 is, from its end portion from which the optical fiber 7A is taken out, inserted into the insertion hole of the bushing 8 so that the optical fiber 7A is introduced into the stopper 6. Thereafter, the bushing 8 is fitted to the rear end of the stopper 6 by press-fitting or other means. At this time, the fixed position of the optical cable 7 and the optical fiber 7A may vary depending on the way of fitting the bushing 8; due to this, it cannot be said that the length of the optical fiber 7A in the stopper 6 (i.e., the length of an extra portion of the optical fiber 7A) is always a predetermined length.

The variation in length of the extra portion of the optical fiber 7A affects optical transmission conditions, such as a transmission loss, of an optical connector. Accordingly, it is required to fit a bushing such that an optical cable is situated at a predetermined position, thereby properly assembling an optical connector-incorporating plug.

The present invention has been made to solve such a problem of conventional art, and an object of the invention is to provide a method of properly manufacturing an optical connector-incorporating plug such that an optical fiber taken out from an end portion of an optical cable can have a fixed length.

Another object of the invention is to provide an optical connector-incorporating plug assembled such that an optical fiber taken out from an end portion of an optical cable can have a fixed length.

In order to attain the above objects, the present invention provides a method of manufacturing an optical connector-incorporating plug, comprising: a step of inserting an optical cable into an insertion hole of a cable insertion component with an optical fiber being taken out from a cable end portion of the optical cable, and putting the cable end portion and the optical fiber into a tubular member; a step of fitting the cable insertion component into the tubular member while checking at least one of the cable end portion and the optical fiber in the tubular member through a hole formed at a peripheral wall of the tubular member; and a step of mounting a surrounding member to the tubular member to thereby cover the hole, the surrounding member being configured to surround at least a part of the peripheral wall of the tubular member.

The present invention also provides an optical connector-incorporating plug comprising: a cable insertion component having an insertion hole in which an optical cable is inserted with an optical fiber being taken out from a cable end portion of the optical cable; a tubular member in which the cable end portion and the optical fiber are placed and in which the cable insertion component is fitted; a hole formed at a peripheral wall of the tubular member at a position where at least one of the cable end portion and the optical fiber in the tubular member is seeable through the hole; and a surrounding member mounted to the tubular member to surround at least a part of the peripheral wall of the tubular member and thereby cover the hole.

DETAILED DESCRIPTION OF THE INVENTION

Figure 1:
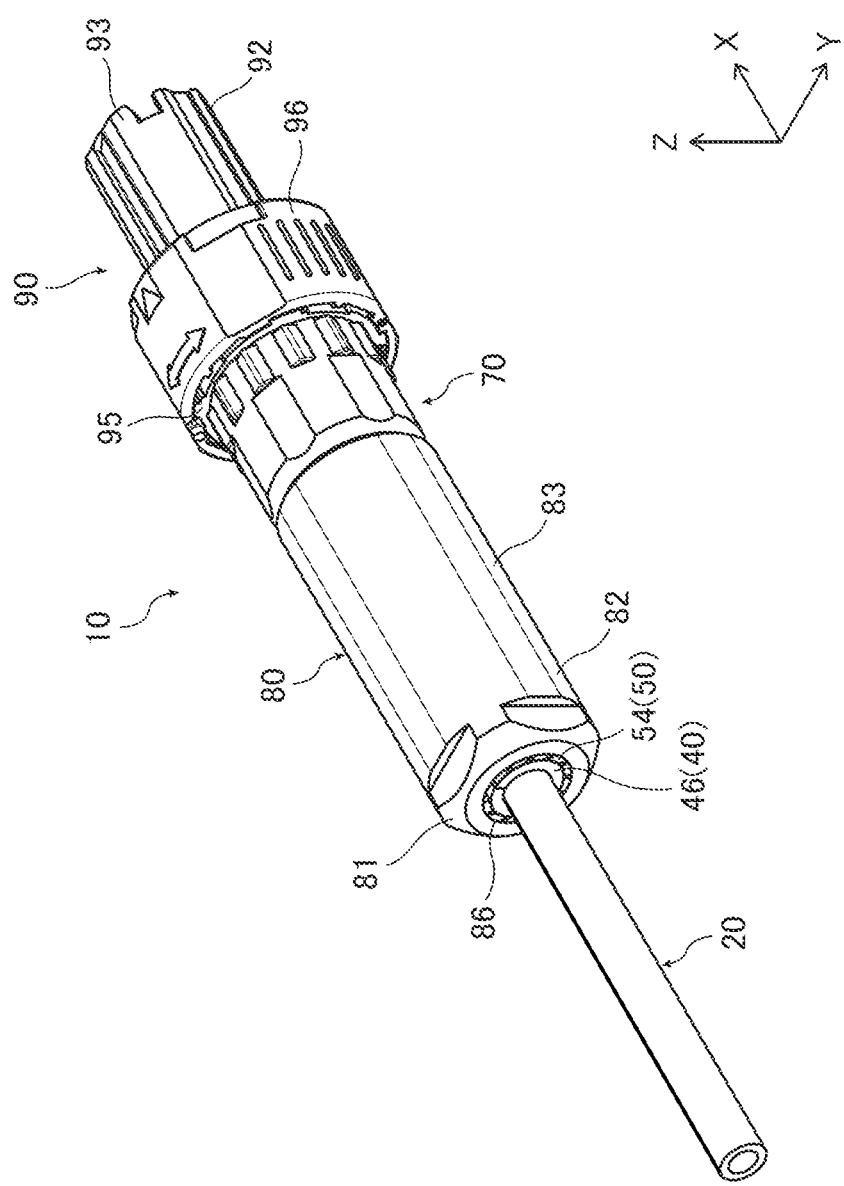
FIG. 1 is a perspective view of an optical connector-incorporating plug according to an embodiment of the invention.

An optical connector-incorporating plug according to an embodiment of the invention is specifically described with reference to the appended drawings.

The embodiment described below is merely one example used to facilitate understanding of the invention, and the invention is by no means limited thereto. In other words, the invention may be modified or improved from the embodiment described below without departing from the scope and spirit of the invention. In particular, the material, shape, design dimension, and other factors of members used in the invention can be freely determined depending on the application of the invention, the state of the art at the time when the invention is implemented, and other conditions. Needless to say, the invention includes its equivalents.

In the following description, the direction of the central axis of the optical connector-incorporating plug and its constituent components is assumed to be an X direction. In the X direction, the side on which a coupling nut 70 is situated when seen from a gland nut 80 to be described later is assumed to be a +X side, and the opposite side therefrom a −X side. In the following description, the +X side and −X side are also called a front side and a rear side, respectively, for convenience. For instance, of the opposite end portions of an end bell 60 to be described later in the X direction, one end portion fastened with the gland nut 80 is assumed to be a rear end portion, and the other end portion opposite therefrom a front end portion.

In the following description, the lateral width direction of a duplex LC connector, which is an optical connector 30 to be described later, is assumed to be a Y direction, and the direction perpendicular to an XY plane a Z direction.

In the present description, the term "tubular (shape)" includes a cylindrical shape and the shape of a polygonal tube whose cross section perpendicular to the central axis is a polygon.

«Structure of Optical Connector-Incorporating Plug»

As shown in FIGS. 1 to 5, the optical connector-incorporating plug according to the embodiment (hereinafter, optical connector-incorporating plug 10) includes an optical cable 20, the optical connector 30, a bushing 40, a clamp 50, the end bell 60, the coupling nut 70, the gland nut 80 and an optical module 90. The optical connector-incorporating plug 10 is manufactured by assembling those components.

The constituent components of the optical connector-incorporating plug 10 are described below.

(Optical Cable)

Figure 4:
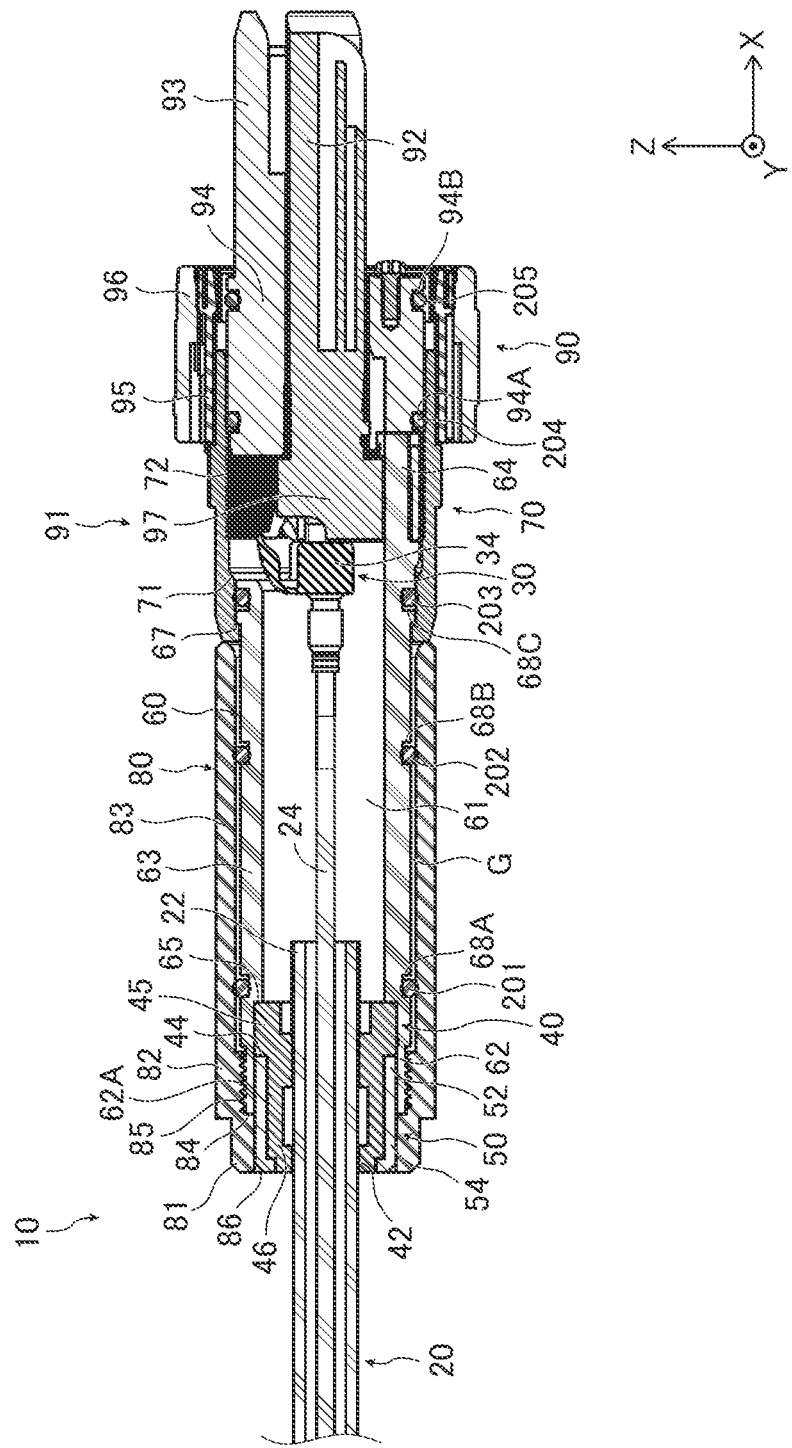
FIG. 4 is a cross-sectional view taken along line I-I of FIG. 2.
Figure 5:
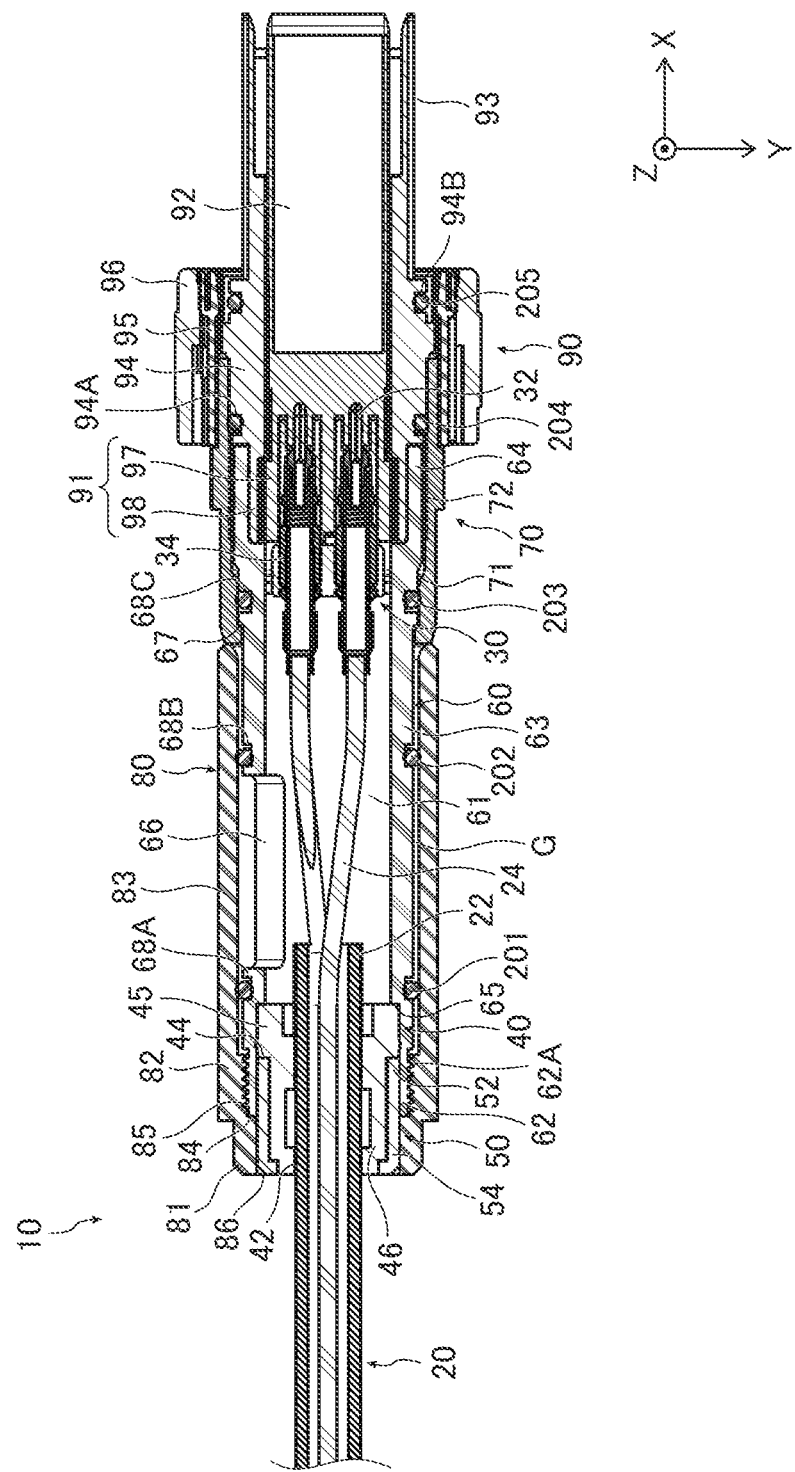
FIG. 5 is a cross-sectional view taken along line II-II of FIG. 3.
Figure 13:
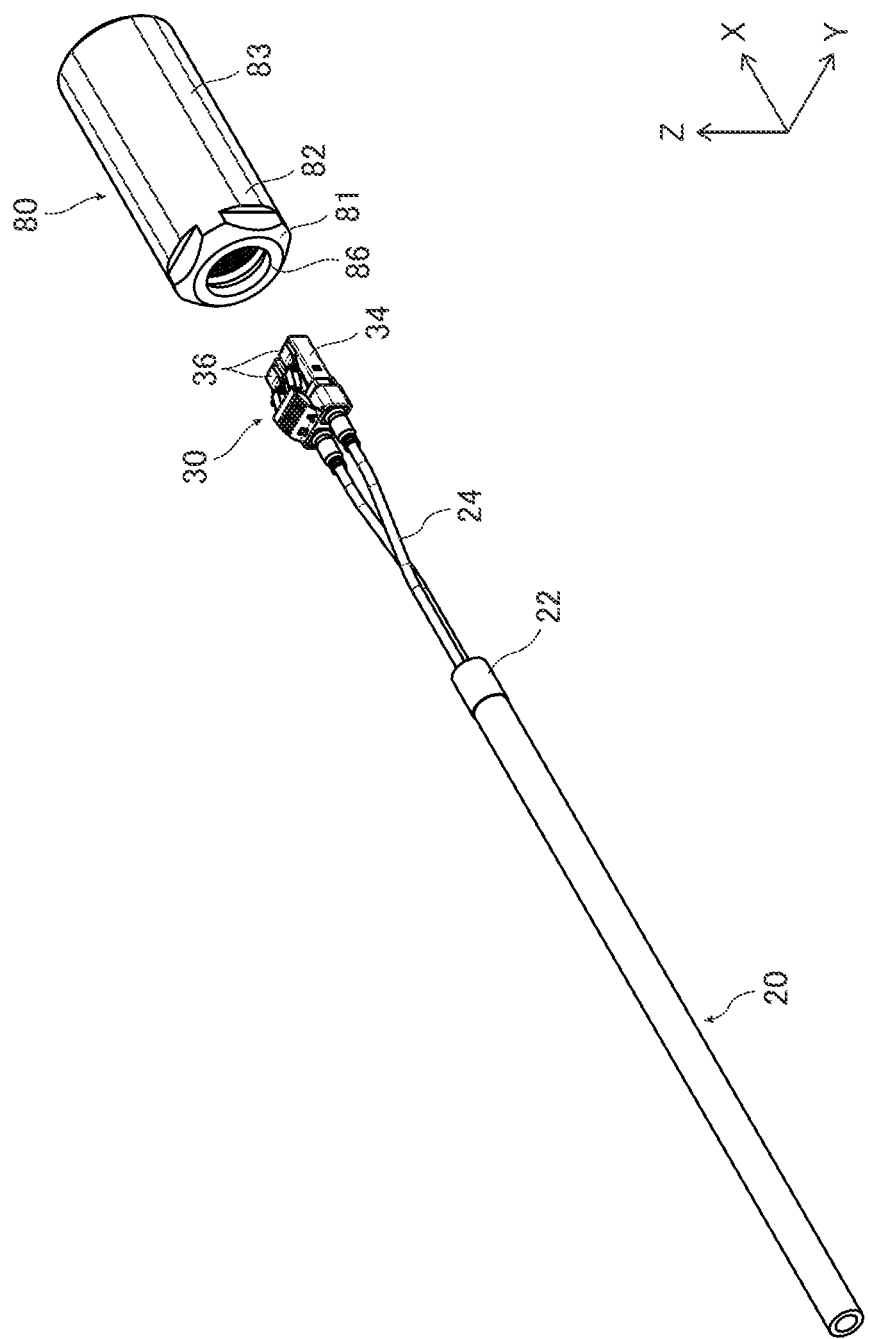
FIG. 13 is a perspective view for showing assembly procedures of the optical connector-incorporating plug of FIG. 1, particularly a first stage of assembly operation.

As shown in FIGS. 4 and 5, the optical cable 20 is inserted in an insertion hole 42 of the bushing 40 and introduced into an internal space 61 of the end bell 60 from the rear end of the end bell 60. As shown in FIG. 13, an optical fiber is taken out from the +X side end of the optical cable 20 (hereinafter called a cable end portion 22). The optical fiber taken out from the cable end portion 22 extends toward the +X side as an optical fiber extra portion 24, and the optical connector 30 is attached to the distal end of the optical fiber extra portion 24. In the optical connector-incorporating plug 10, the cable end portion 22 and the optical fiber extra portion 24 are accommodated in the end bell 60 as shown in FIGS. 4, 5, 7 and 8.

(Optical Connector)

The optical connector 30 is a component attached to the distal end, i.e., the +X side end of the optical fiber extra portion 24. The optical connector 30 is constituted of a known connector for optical cables, and in the embodiment, is constituted of a typical duplex LC connector which is one example of such a known connector. However, the invention is not limited thereto, and an optical connector constituted of an SC connector may be used.

Figure 7:
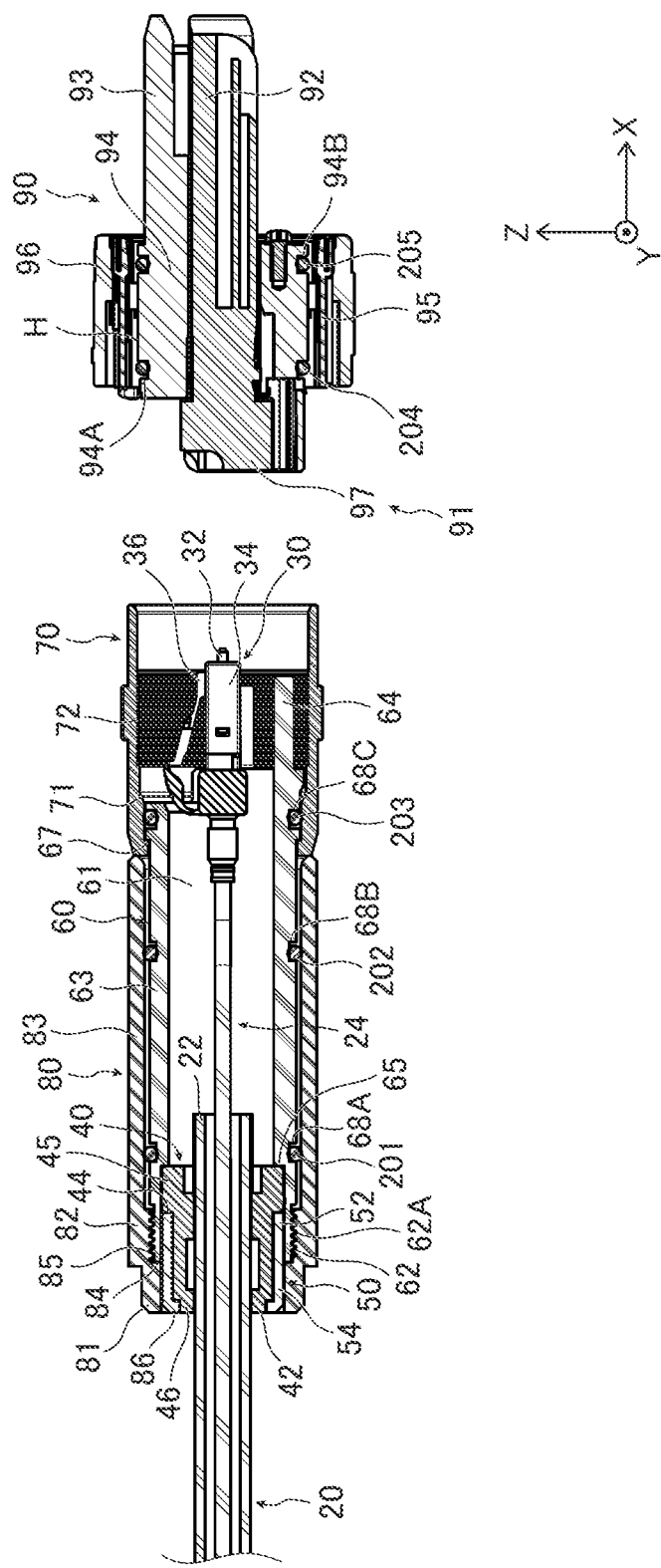
FIG. 7 is a cross-sectional view corresponding to FIG. 4 and showing the optical connector-incorporating plug from which the optical module is detached.
Figure 8:
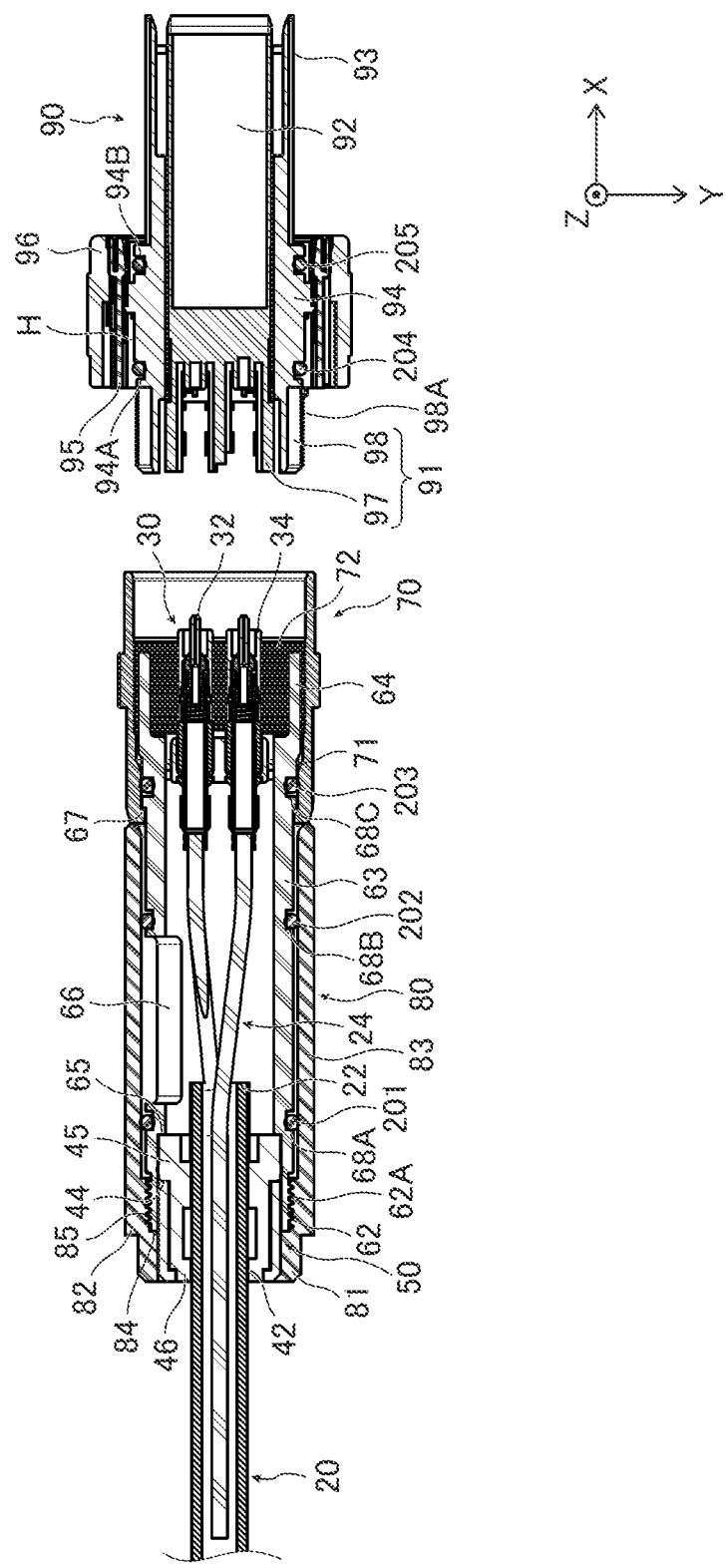
FIG. 8 is a cross-sectional view corresponding to FIG. 5 and showing the optical connector-incorporating plug from which the optical module is detached.

As shown in FIGS. 7 and 8, the optical connector 30 includes a ferrule 32 that holds a resin-coated fiber strand situated at the distal end of the optical fiber extra portion 24, a connector body 34 accommodating the ferrule 32 therein, and latch pieces 36 provided on the upper surface of the connector body 34.

(Bushing)

Figure 9:
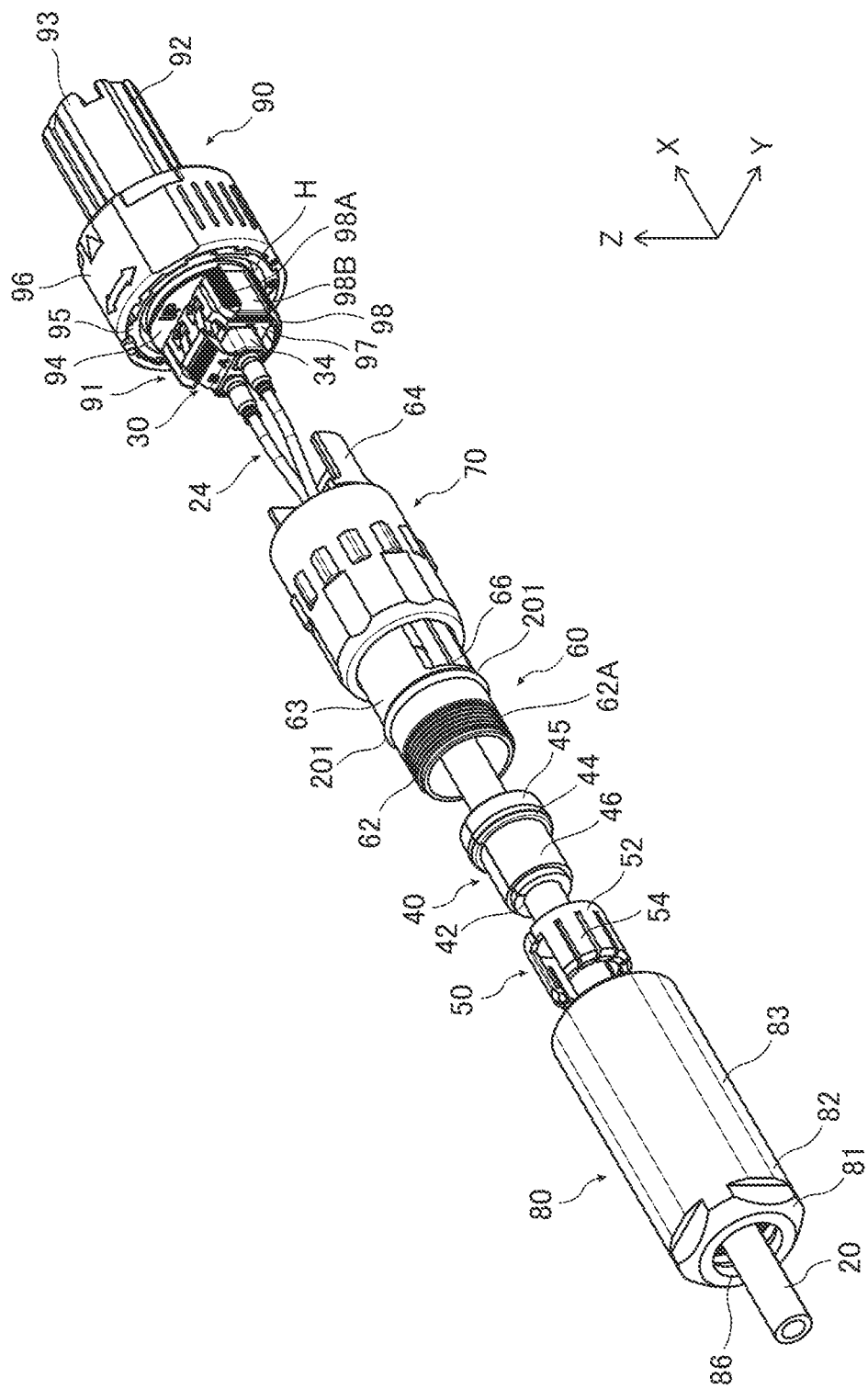
FIG. 9 is a perspective view showing the optical connector-incorporating plug of FIG. 1 in an exploded state, as seen from the rear of the optical connector-incorporating plug.
Figure 10:
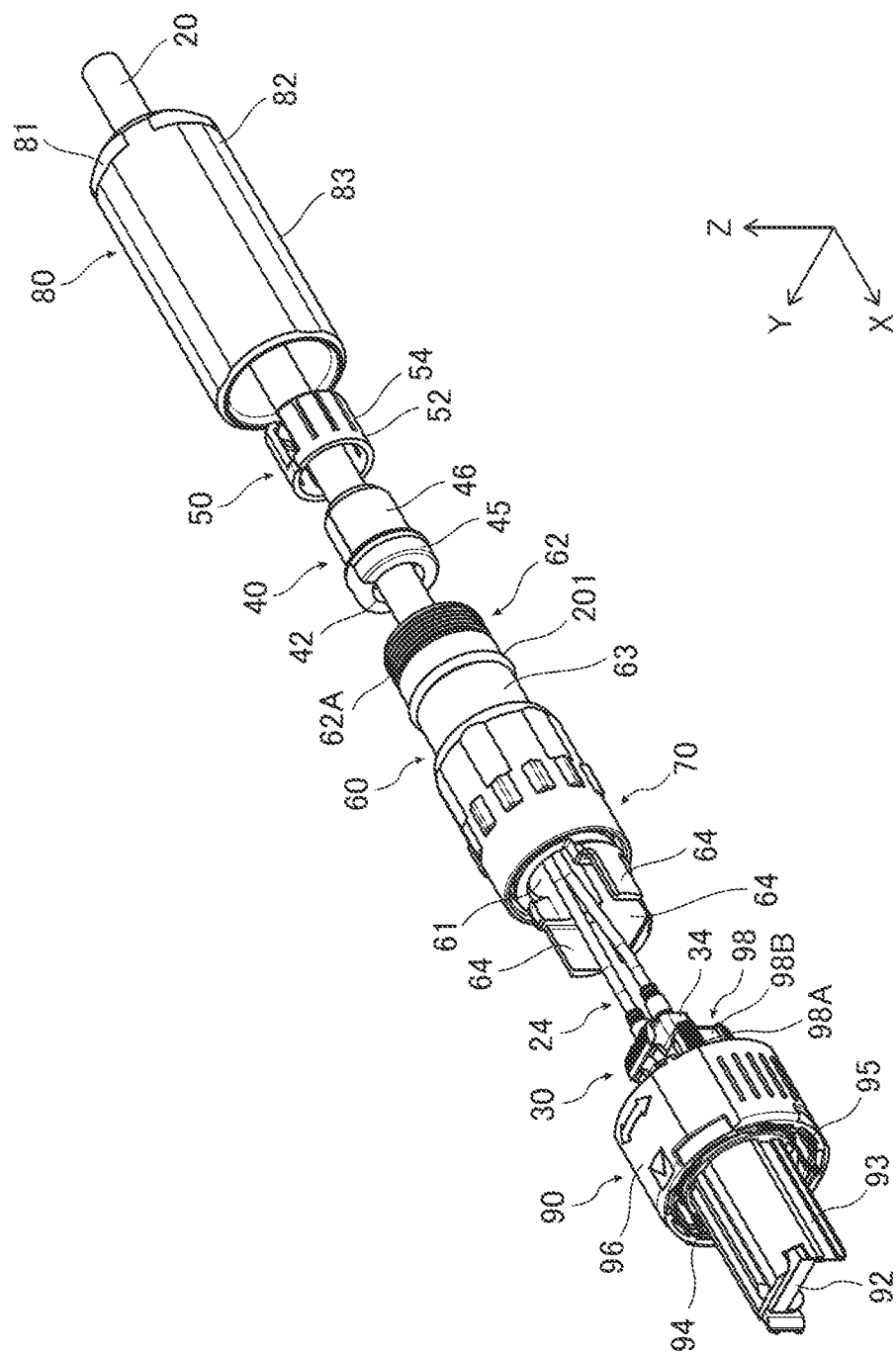
FIG. 10 is a perspective view showing the optical connector-incorporating plug of FIG. 1 in the exploded state, as seen from the front of the optical connector-incorporating plug.
Figure 15:
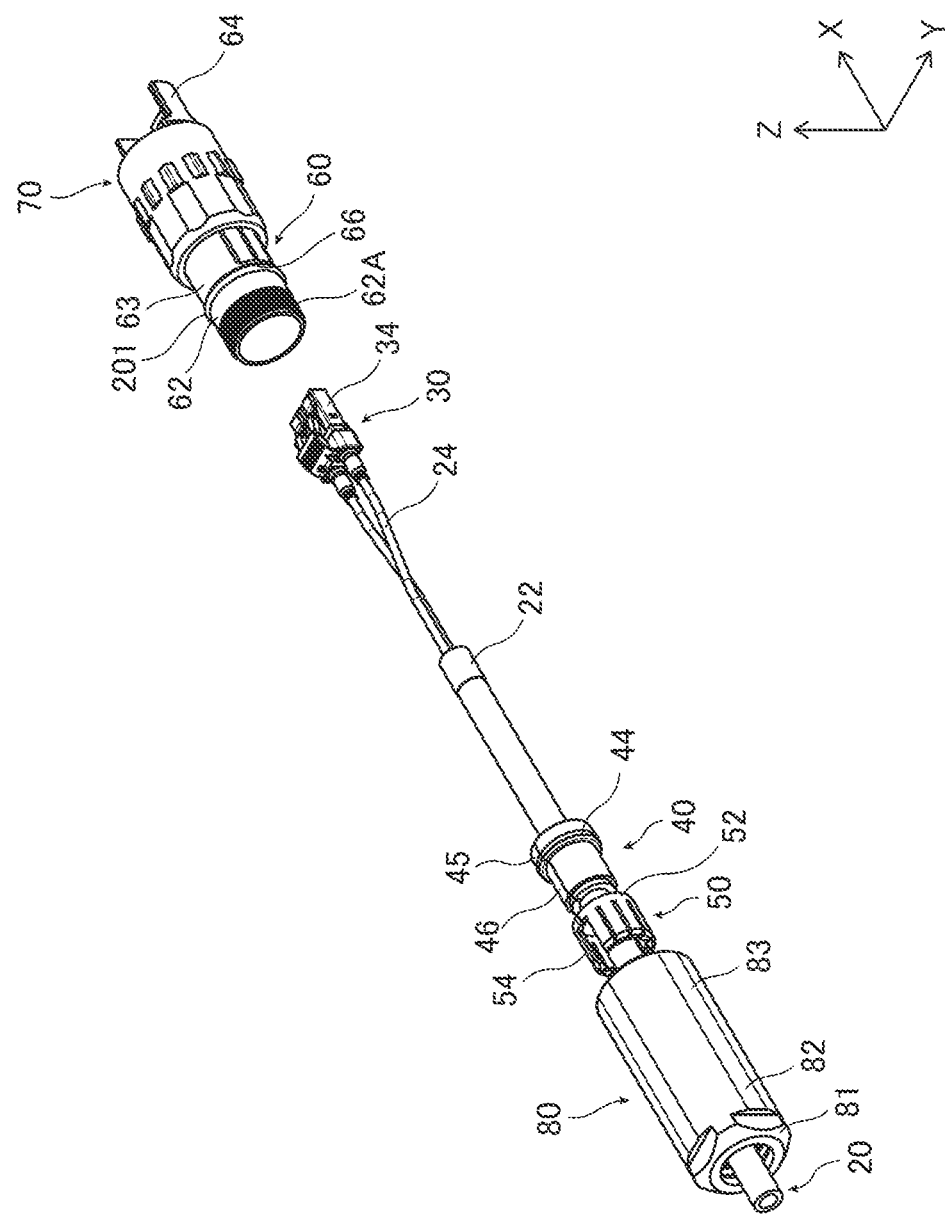
FIG. 15 is a perspective view for showing the assembly procedures of the optical connector-incorporating plug of FIG. 1, particularly a third stage of the assembly operation.
Figure 16:
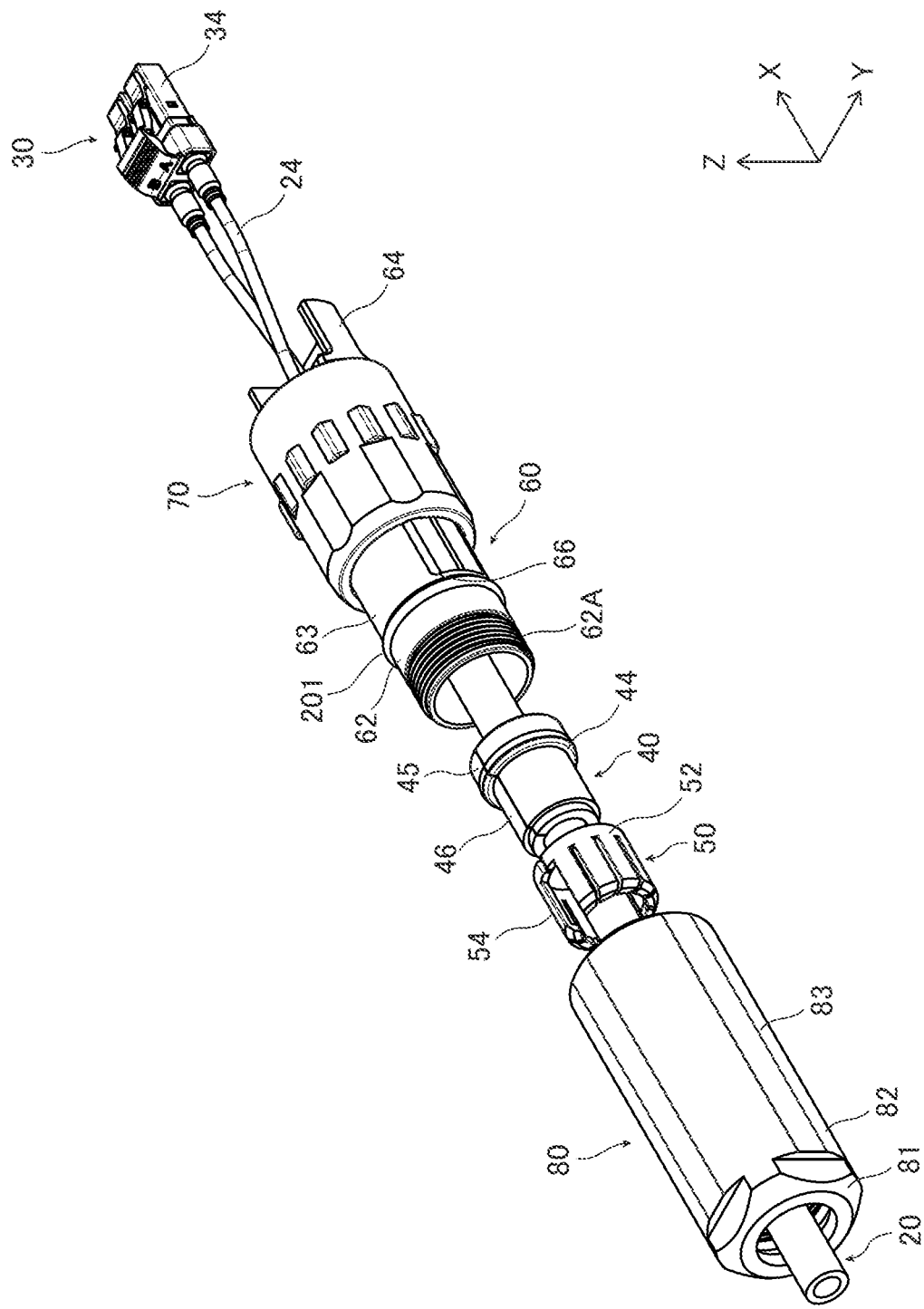
FIG. 16 is a perspective view for showing the assembly procedures of the optical connector-incorporating plug of FIG. 1, particularly a fourth stage of the assembly operation.

The bushing 40 corresponds to a cable insertion component, is a molded product made of a resin material having elasticity, such as a rubber material, and has a substantially cylindrical shape as a whole as shown in FIGS. 9, 10 and 16. The bushing 40 has the insertion hole 42 extending in the direction of the central axis of the bushing 40 (i.e., the X direction), and the optical cable 20 is inserted in the insertion hole 42 as shown in FIGS. 9, 10 and 15. The inner diameter of the bushing 40, which corresponds to the diameter of the insertion hole 42, is slightly larger than the outer diameter of the optical cable 20 before the optical connector-incorporating plug 10 is assembled.

Figure 14:
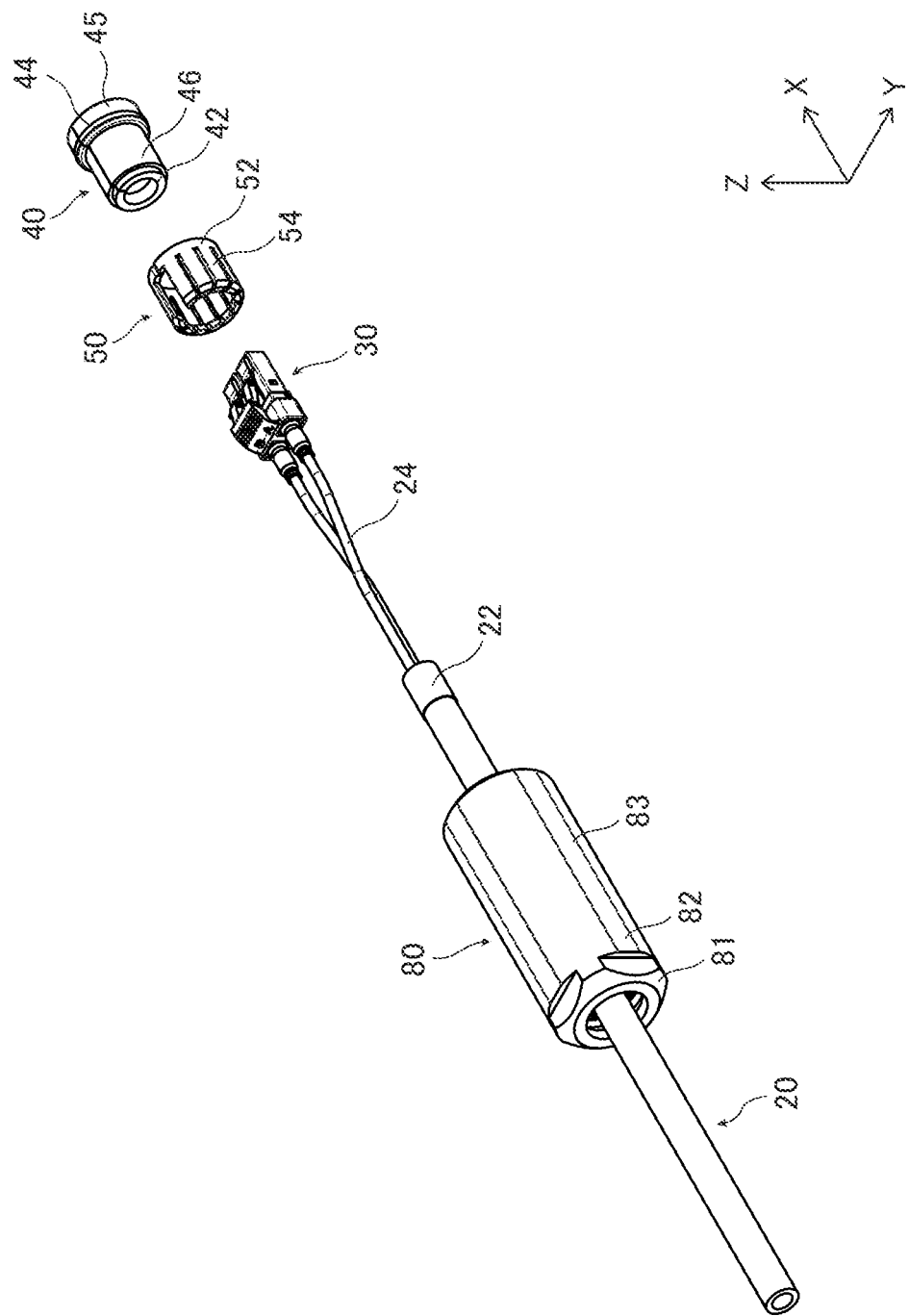
FIG. 14 is a perspective view for showing the assembly procedures of the optical connector-incorporating plug of FIG. 1, particularly a second stage of the assembly operation.

As shown in FIGS. 9 and 14, a step 44 is provided at the outer peripheral surface of the bushing 40. In the bushing 40, the outer diameter of a front portion 45 situated anterior to the step 44 is larger than the outer diameter of a rear portion 46 situated posterior to the step 44 by the height of the step 44.

Figure 20:
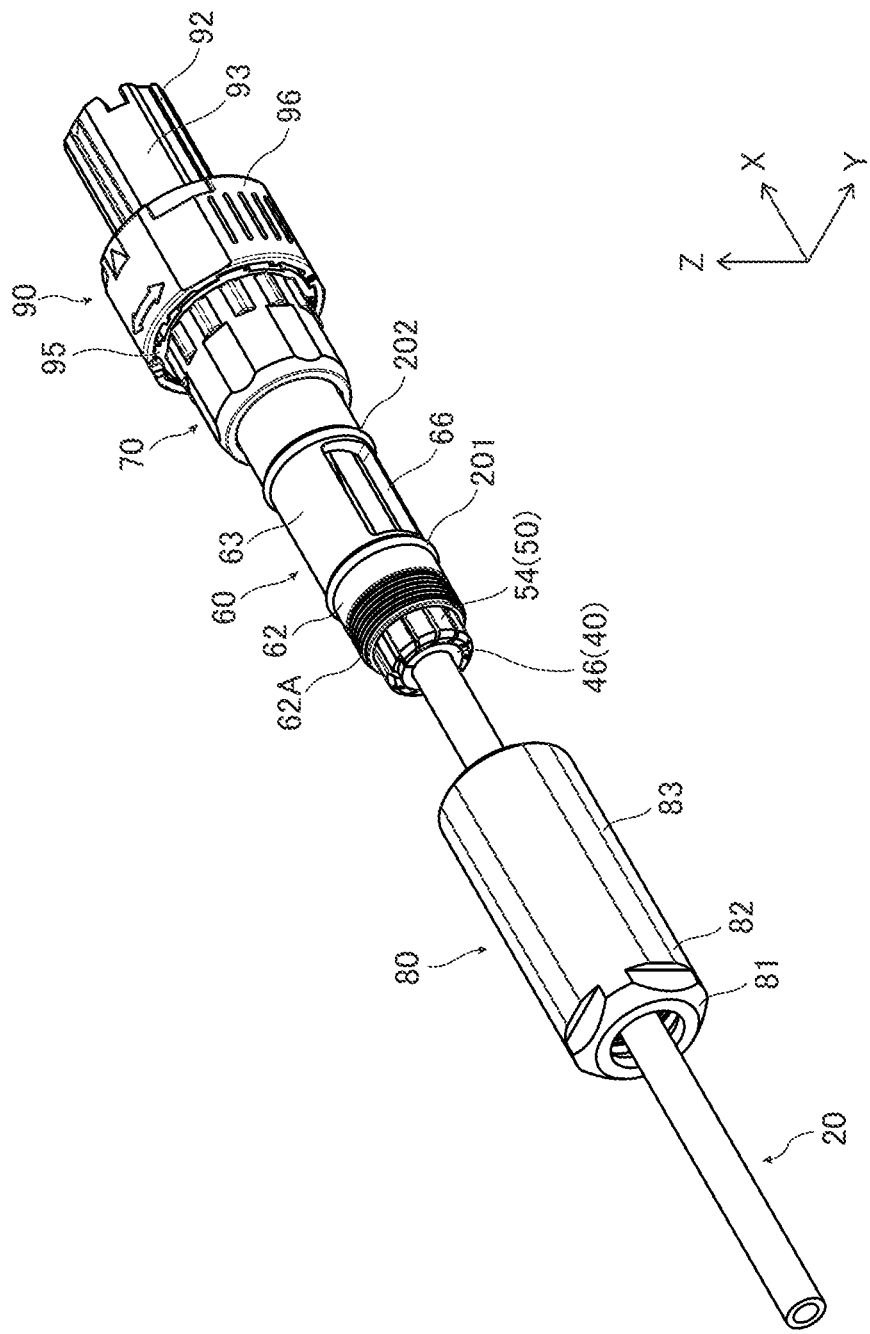
FIG. 20 is a perspective view for showing the assembly procedures of the optical connector-incorporating plug of FIG. 1, particularly an eighth stage of the assembly operation.

As shown in FIGS. 16 and 20, the bushing 40 is fitted, more precisely, lightly press-fitted into the end bell 60 from the open rear end of the end bell 60. At the time when the press-fitting process is completed, the rear portion 46 slightly protrudes from the rear end of the end bell 60. When the gland nut 80 is fastened to the rear end portion of the end bell 60 fitted with the bushing 40, the inner peripheral surface of the gland nut 80 compresses the bushing 40 via the clamp 50, so that the rear portion 46 of the bushing 40 elastically deforms and narrows radially inward. Consequently, the bushing 40 is closely attached to the optical cable 20 in the insertion hole 42 and, together with the optical cable 20, fixed with respect to the end bell 60.

Figure 11:
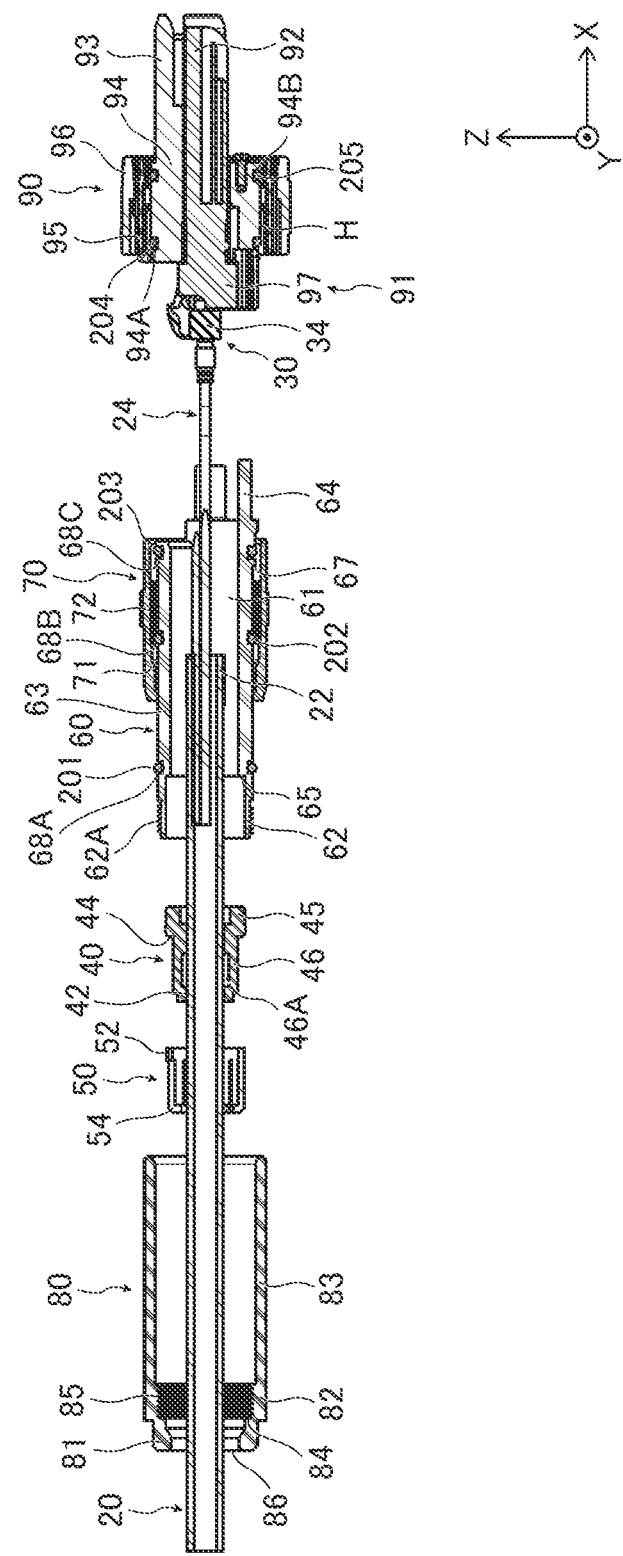
FIG. 11 is a cross-sectional view corresponding to FIG. 4 and showing the optical connector-incorporating plug in the exploded state.
Figure 12:
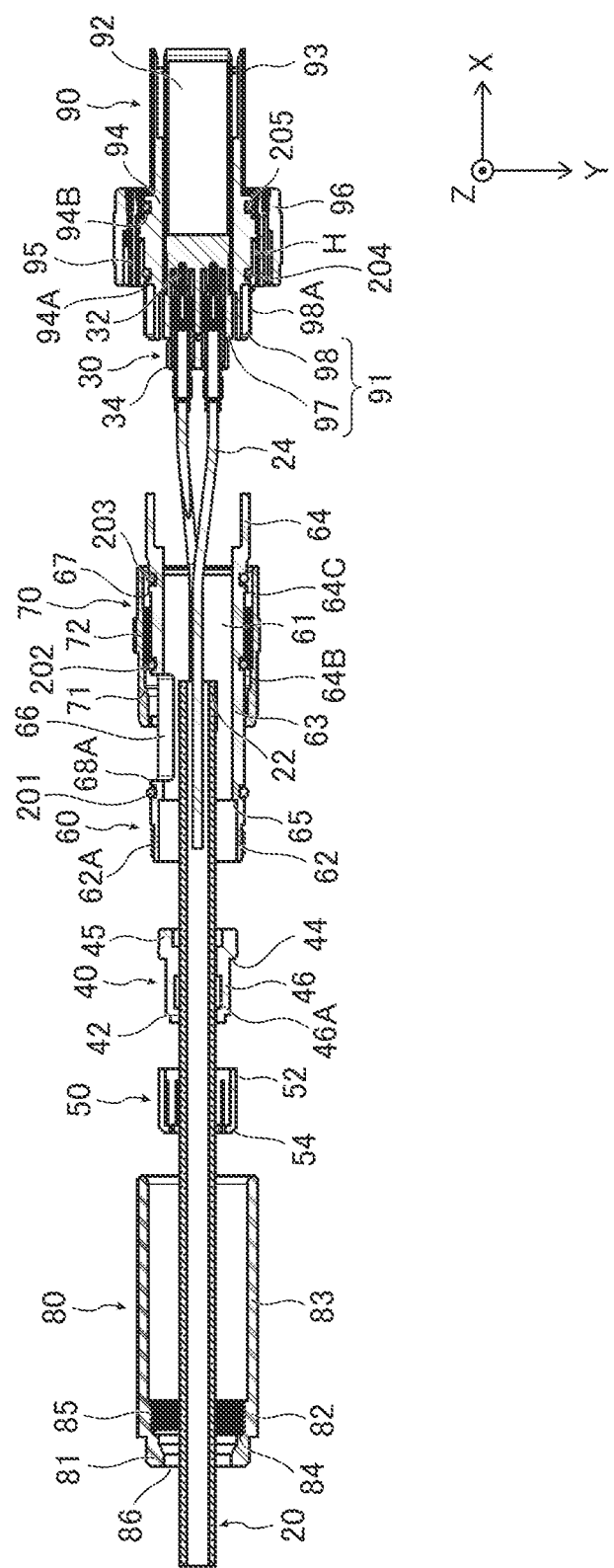
FIG. 12 is a cross-sectional view corresponding to FIG. 5 and showing the optical connector-incorporating plug in the exploded state.

As shown in FIGS. 11 and 12, a recessed groove 46A is formed in the inner peripheral surface of the rear portion 46 in the circumferential direction of the bushing 40 over the entire circumference thereof. In the rear portion 46, a portion provided with the recessed groove 46A has a thickness smaller than that of the other portions. Owing to this configuration, the rear portion 46 easily bends when being compressed by the gland nut 80, thus allowing the bushing 40 to be closely attached to the optical cable 20 well.

(Clamp)

The clamp 50 is a resin-molded product formed in a cylindrical shape. As shown in FIGS. 4, 5, 7 and 8, the clamp 50 is assembled to the bushing 40 and, together with the bushing 40, fitted into the end bell 60 from the open rear end of the end bell 60. The clamp 50 has an axial length (i.e., length in the direction of the central axis) substantially same as the rear portion 46 of the bushing 40.

As shown in FIGS. 9, 10 and 14, the clamp 50 includes a tubular portion 52 situated on the front side and a plurality of rear extending portions 54 extending rearward from the tubular portion 52. The tubular portion 52 has an inner diameter larger than the outer diameter of the rear portion 46 of the bushing 40 and an outer diameter smaller than the outer diameter of the front portion 45 of the bushing 40. The rear extending portions 54 are arranged in the circumferential direction of the clamp 50 in an annular manner when viewed from the X direction, and a small gap is provided between adjacent rear extending portions 54 in the circumferential direction.

As shown in FIGS. 14 and 15, the optical cable 20 is passed through a hollow portion provided in the clamp 50, and thereafter, the clamp 50 is assembled from its front end side to the rear portion 46 of the bushing 40. More specifically, the rear portion 46 of the bushing 40 is inserted into the tubular portion 52, and the rear portion 46 is inserted into the clamp 50 up to the position where the front end of the tubular portion 52 abuts the step 44 of the bushing 40.

The clamp 50 assembled to the bushing 40 is, together with the bushing 40, fitted into the end bell 60 from the open rear end of the end bell 60 as described above. At the time when the fitting process of the clamp 50 is completed, the rear extending portions 54 slightly protrude from the rear end of the end bell 60. When the gland nut 80 is screwed and tightly fastened on the rear end portion of the end bell 60 fitted with the bushing 40 and the clamp 50, each rear extending portion 54 of the clamp 50 is pushed radially inward by the inner peripheral surface of the gland nut 80. Consequently, each rear extending portion 54 bends radially inward to compress the rear portion 46 of the bushing 40, whereby the rear portion 46 elastically deforms and narrows so as to be closely attached to the optical cable 20.

(End Bell)

The end bell 60 is a tubular member, has a cylindrical shape elongated in the direction of the central axis, and has open ends at its opposite ends. The material of the end bell 60 is not particularly limited; for instance, the end bell 60 may be made of a resin or metal material, or a combination thereof. As shown in FIGS. 11 and 12, the cable end portion 22 of the optical cable 20 and the optical fiber extra portion 24 are passed through the open rear end of the end bell 60. When the assembly process of the optical connector-incorporating plug 10 is completed, as shown in FIGS. 4 and 5, the cable end portion 22 and the optical fiber extra portion 24 are accommodated in the internal space 61 of the end bell 60. The optical connector 30 is disposed near the front end of the internal space 61 as shown in FIGS. 7 and 8.

As shown in FIGS. 9 to 12 and 15, the end bell 60 includes the rear end portion (hereinafter, rear end portion 62), a trunk portion 63 extending forward from the rear end portion 62, and protruding piece portions 64 protruding forward from the trunk portion 63. The rear end portion 62 is constituted of an annular peripheral wall and has an inner diameter equal to or slightly larger than the outer diameter of the front portion 45 of the bushing 40. The axial length (i.e., length in the X direction) of the rear end portion 62 is larger than the axial length of the front portion 45 of the bushing 40 and smaller than the entire length (i.e., entire length in the X direction) of the bushing 40. As shown in FIGS. 4, 5, 19 and 20, the bushing 40 having the optical cable 20 inserted in the insertion hole 42 is fitted, more precisely, lightly press-fitted into the rear end portion 62. At this time, the clamp 50 assembled to the rear portion 46 of the bushing 40 is also, together with the bushing 40, fitted into the rear end portion 62.

As shown in FIGS. 9, 10 and 15, a rear end screw portion 62A is formed in the outer peripheral surface of the rear end portion 62 over a certain range in the X direction from the rear end of the end bell 60. The rear end screw portion 62A is mated with a threaded portion 85 provided in the inner peripheral surface of the gland nut 80, whereby the gland nut 80 is fastened to the rear end portion 62 of the end bell 60.

The trunk portion 63 is constituted of a cylindrical peripheral wall and elongated in the X direction, i.e., the direction of the central axis of the end bell 60. As shown in FIGS. 4 and 5, the cable end portion 22 and the optical fiber extra portion 24 accommodated in the internal space 61 of the end bell 60 are disposed in the trunk portion 63. In other words, the trunk portion 63 serves as a protective tube surrounding the optical fiber extra portion 24.

The trunk portion 63 has the shape of a substantially linear tube as shown in FIGS. 11 and 12, and the outer diameter thereof is uniform over almost the entire trunk portion 63 except a step 67 to be described later and a portion situated anterior to the step 67. As shown in FIGS. 11 and 12, the inner diameter of the trunk portion 63 is smaller than that of the rear end portion 62. That is, the inner peripheral surface of the end bell 60 is provided with a step 65 formed at the boundary position between the rear end portion 62 and the trunk portion 63. The bushing 40 is fitted and lightly press-fitted into the end bell 60 up to the position where the front end of the bushing 40 abuts the step 65 as shown in FIGS. 4, 5, 7 and 8.

Figure 19:
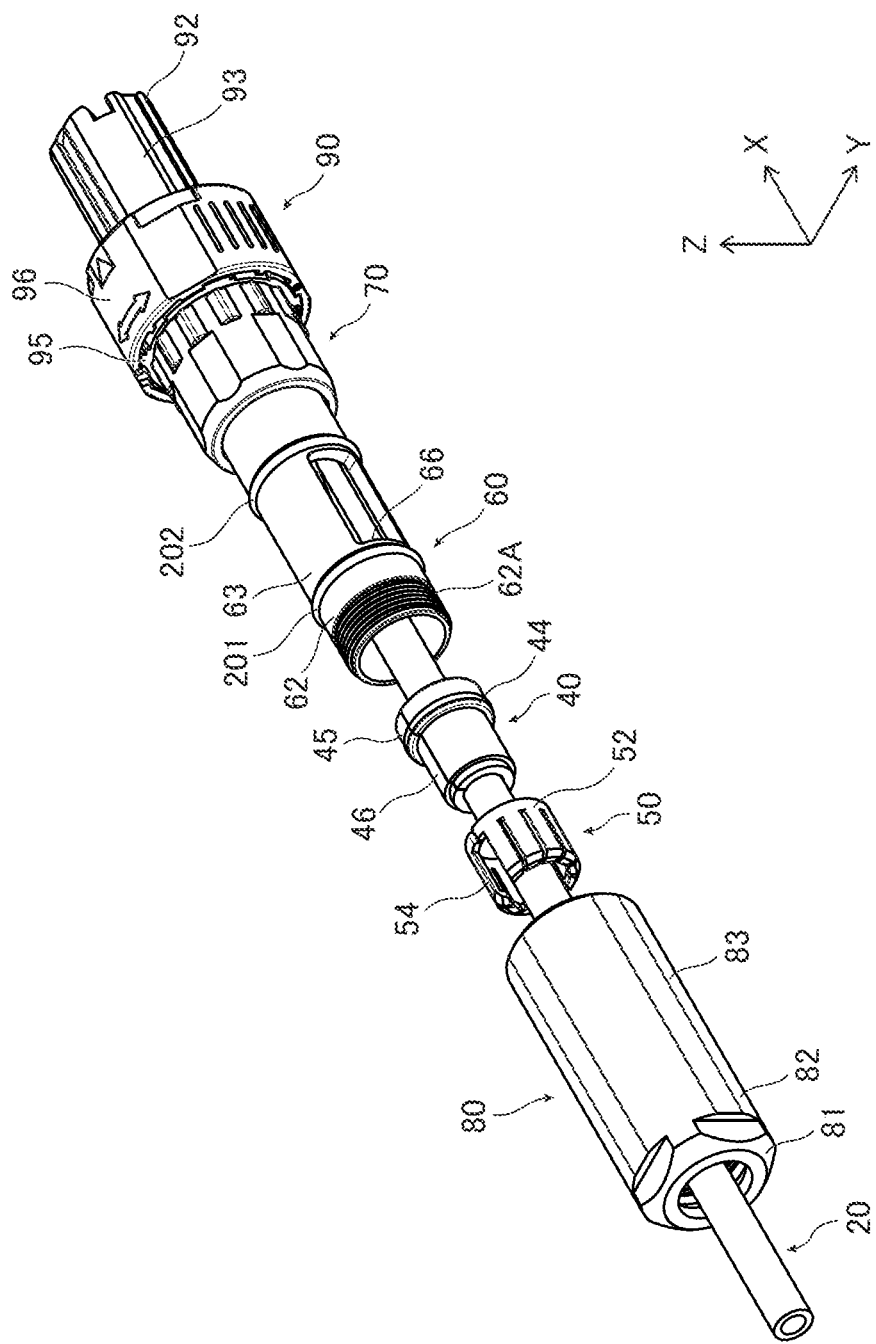
FIG. 19 is a perspective view for showing the assembly procedures of the optical connector-incorporating plug of FIG. 1, particularly a seventh stage of the assembly operation.

The peripheral wall forming the trunk portion 63 is provided with one hole 66. This hole 66 is formed in a rearward portion of the trunk portion 63, is elongated in the X direction as shown in FIGS. 5 and 19, and has a rectangular shape when viewed from the front direction (Y direction). The length of the long sides (length in the X direction) of the hole 66 is preferably a third to a half of the axial length of the trunk portion 63.

The cable end portion 22 and the optical fiber extra portion 24 in the end bell 60 can be checked through the hole 66 after the cable end portion 22 and the optical fiber extra portion 24 are introduced to the internal space 61 of the end bell 60 until the gland nut 80 is fastened to the end bell 60. That is, the hole 66 is formed at the peripheral wall of the trunk portion 63 at a position where the cable end portion 22 and the optical fiber extra portion 24 are seeable through the hole, and serves as an eye hole.

The number of holes 66 formed at the end bell 60 is not limited to one and may be two or more. In this case, two or more holes 66 are preferably formed at positions different in the X direction.

As shown in FIGS. 5 and 12, two O-ring accommodating grooves 68A and 68B are provided in regions near the hole 66 on the outer peripheral surface of the trunk portion 63. Each of the two O-ring accommodating grooves 68A and 68B is an annular accommodating groove formed over the whole circumference of the trunk portion 63. The O-ring accommodating groove 68A is situated immediately posterior to the hole 66, while the O-ring accommodating groove 68B is situated immediately anterior to the hole 66.

As shown in FIGS. 4, 5, 7 and 8, another O-ring accommodating groove 68C is provided in a region away from the hole 66 on the outer peripheral surface of the trunk portion 63, more specifically, in a region near the front end of the trunk portion 63, so as to form an annular shape over the whole circumference of the outer peripheral surface of the trunk portion 63. The O-ring accommodating grooves 68A, 68B and 68C receive O-rings 201, 202 and 203, respectively.

The protruding piece portions 64 are protruding pieces extending straight toward the +X side. In the embodiment, as shown in FIG. 10, three protruding piece portions 64 are provided at 90 degree intervals in the circumferential direction of the end bell 60. To join the end bell 60 to the optical module 90, the protruding piece portions 64 are each inserted into an insertion groove 98B provided at a module-side connector 91 (see FIGS. 17 and 18).

As shown in FIGS. 7 and 8, the outer peripheral surface of the end bell 60 is provided with a step 67 at a position slightly posterior to the boundary position between the trunk portion 63 and the protruding piece portions 64, and the outer peripheral surfaces of the protruding piece portions 64 are situated radially outward more than the outer peripheral surface of the trunk portion 63 by the step 67. When slid toward the +X side on the outer peripheral surface of the trunk portion 63 of the end bell 60, the coupling nut 70 is movable up to the position where the edge of the rear end opening of the coupling nut 70 abuts the step 67.

(Coupling Nut)

Figure 18:
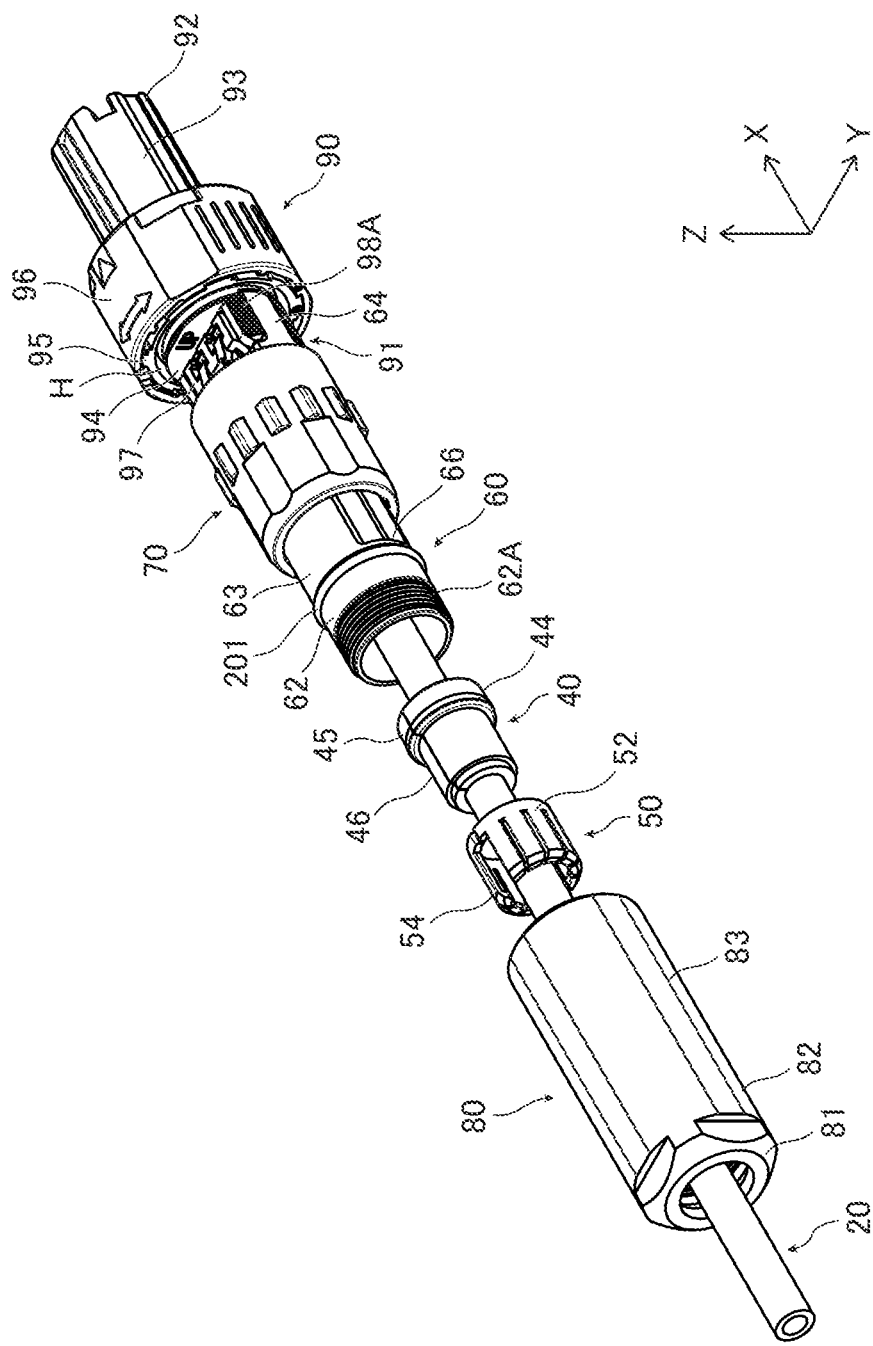
FIG. 18 is a perspective view for showing the assembly procedures of the optical connector-incorporating plug of FIG. 1, particularly a sixth stage of the assembly operation.

The coupling nut 70 is a component for joining the end bell 60 to the optical module 90. The coupling nut 70 has a tubular shape as a whole, and as shown in FIGS. 11, 12 and 15, the trunk portion 63 of the end bell 60 passes through the inside of the coupling nut 70. The coupling nut 70 is slidable in the X direction on the outer peripheral surface of the trunk portion 63, and is moved toward the +X side when the end bell 60 is joined to the optical module 90. With the end bell 60 being joined with the optical module 90, the front end portion of the coupling nut 70 is inserted in an annular gap H provided in the optical module 90 as shown in FIGS. 18 and 19.

As shown in FIGS. 4, 5, 7 and 8, a step 71 is provided at a position slightly close to the rear end of the coupling nut 70 on the inner peripheral surface of the coupling nut 70, and the inner diameter of the coupling nut 70 in the region posterior to the step 71 is smaller than that in the region anterior to the step 71. The inner peripheral surface of the coupling nut 70 is provided with a nut threaded portion 72 over a certain range from a position slightly anterior to the step 71. The nut threaded portion 72 is mated with a module-side screw portion 98A provided at the module-side connector 91, whereby the coupling nut 70 is coupled to the optical module 90 and the end bell 60 is joined to the optical module 90.

To couple the coupling nut 70 to the optical module 90, the coupling nut 70 is, while being turned, slid in the X direction on the outer peripheral surface of the trunk portion 63, that is, the coupling nut 70 is screwed on the module-side screw portion 98A. In this process, the coupling nut 70 is screwed up to the position where the edge of the rear end opening of the coupling nut 70 abuts the step 67 on the outer peripheral surface of the end bell 60 as shown in FIGS. 4, 5, 7 and 8. With the edge of the rear end opening of the coupling nut 70 abutting the step 67, the O-ring 203 disposed in the O-ring accommodating groove 68C contacts a region near the rear end of the coupling nut 70 on the inner peripheral surface of the coupling nut 70 as shown in FIGS. 4, 5, 7 and 8. Consequently, the portion between the coupling nut 70 and the trunk portion 63 is sealed by the O-ring 203.

(Gland Nut)

The gland nut 80 corresponds to a surrounding member. After the bushing 40 is fitted into the rear end portion 62 of the end bell 60, the gland nut 80 is fastened to the rear end portion 62 and surrounds the peripheral wall of the end bell 60 as shown in FIGS. 4, 5, 7 and 8. As shown in FIGS. 9 and 10, the gland nut 80 has a tubular shape as a whole. The front end and the rear end of the gland nut 80 are open ends. The inner diameter of the gland nut 80 on the rear end side gradually decreases toward the rear end.

The end bell 60 is inserted into the gland nut 80 from the front end side of the gland nut 80. Thereafter, the threaded portion 85 formed in the inner peripheral surface of the gland nut 80 is mated with the rear end screw portion 62A formed in the outer surface of the rear end portion 62 of the end bell 60. The gland nut 80 is screwed on the rear end portion 62 with the threaded portion 85 and the rear end screw portion 62A being mated with each other, whereby the gland nut 80 is fastened to the rear end portion 62.

When the gland nut 80 is fastened to the rear end portion 62, the bushing 40 and the clamp 50 press-fitted in the rear end portion 62, specifically, the portions of the bushing 40 and the clamp 50 that protrude from the rear end of the end bell 60 are compressed radially inward. Consequently, the bushing 40 is closely attached to the inner peripheral surface of the rear end portion 62 and the optical cable 20, the rear end of the end bell 60 is tightly closed as shown in FIGS. 1 and 6 to 8, and the optical cable 20, the bushing 40 and the clamp 50 are fixed with respect to the end bell 60.

The gland nut 80 is elongated in the direction of its central axis, and the entire length (the length in the X direction) thereof exceeds a half of the length of the end bell 60. As shown in FIGS. 9 and 10, the gland nut 80 includes, in the order from the side close to the rear end, a bottom portion 81 having an opening 86 in its center, a fastening portion 82 to be fastened to the rear end portion 62 of the end bell 60, and an extending portion 83 extending forward from the fastening portion 82. The bottom portion 81 is constituted of an annular peripheral wall, and the fastening portion 82 and the extending portion 83 are constituted of a tubular peripheral wall.

In the state where the gland nut 80 is fastened to the rear end portion 62, the bottom portion 81 surrounds each of the portions of the bushing 40 and the clamp 50 that protrudes from the rear end of the end bell 60. As shown in FIGS. 4, 5, 7 and 8, the inner diameter of the bottom portion 81 is smaller than that of the fastening portion 82. That is, the inner peripheral surface of the gland nut 80 is provided with a step 84 at the boundary position between the bottom portion 81 and the fastening portion 82. The gland nut 80 is screwed on the end bell 60 until the rear end of the end bell 60 finally abuts the step 84.

The fastening portion 82 extends forward from the front end of the bottom portion 81 and is provided in its inner peripheral surface with the threaded portion 85. The extending portion 83 has the shape of a straight tube and is elongated in the X direction. In the state where the gland nut 80 is fastened to the rear end portion 62, each of the peripheral walls of the rear end portion 62 and the trunk portion 63 of the end bell 60 is surrounded by the extending portion 83 as shown in FIGS. 4, 5, 7 and 8. That is, in the state where the fastening portion 82 is fastened to the rear end portion 62, the extending portion 83 faces the hole 66 of the end bell 60, and the front end of the extending portion 83 is situated anterior to the hole 66 (on the +X side) in the X direction.

The outer diameter of the extending portion 83 is the same as that of the fastening portion 82. The inner diameter of the extending portion 83 is slightly larger than that of the fastening portion 82 and larger than the outer diameter of the trunk portion 63 of the end bell 60. That is, in the state where the gland nut 80 is fastened to the rear end portion 62, an annular gap G is formed between the outer peripheral surface of the trunk portion 63 and the inner peripheral surface of the extending portion 83 as shown in FIGS. 4 and 5.

Further, in the state where the gland nut 80 is fastened to the rear end portion 62, the two O-rings 201 and 202 attached to the outer peripheral surface of the trunk portion 63 contact the inner peripheral surface of the extending portion 83 to thereby seal the gap G as shown in FIGS. 4 and 5. That is, the two O-rings 201 and 202 correspond to a plurality of seal members and seal the gap G over the whole circumference of the outer peripheral surface of the trunk portion 63 in the state where the gland nut 80 is fastened to the rear end portion 62.

In the embodiment, the two O-rings 201 and 202 are situated away from each other in the X direction (i.e., the direction of the central axis of the end bell 60), and the hole 66 is situated between the O-rings 201 and 202. In other words, the hole 66 is formed at a position sandwiched by the two O-rings 201 and 202 in the trunk portion 63. That is, a water and dust proof structure formed of the O-rings 201 and 202 is built near the hole 66, and this makes it possible to prevent moisture and foreign matter such as dust, and the like, from entering the end bell 60 through the hole 66.

(Optical Module)

The optical module 90 forms the distal end of the optical connector-incorporating plug 10 and is to be connected to an adapter of a receptacle (not shown). The optical module 90 is constituted of a known optical module and, in the embodiment, is constituted of a small form-factor pluggable (SFP) module which is one example of such a known optical module. However, the invention is not limited thereto, and other optical modules than the SFP module are usable.

As shown in FIGS. 6 to 9 and 17, the optical module 90 receives the optical connector 30 to be connected to the optical connector 30. As shown in FIGS. 6 to 9, the optical module 90 includes the module-side connector 91, a module body 92, a cover portion 93, a first cylindrical portion 94, a second cylindrical portion 95 and an outer tubular portion 96.

Figure 6:
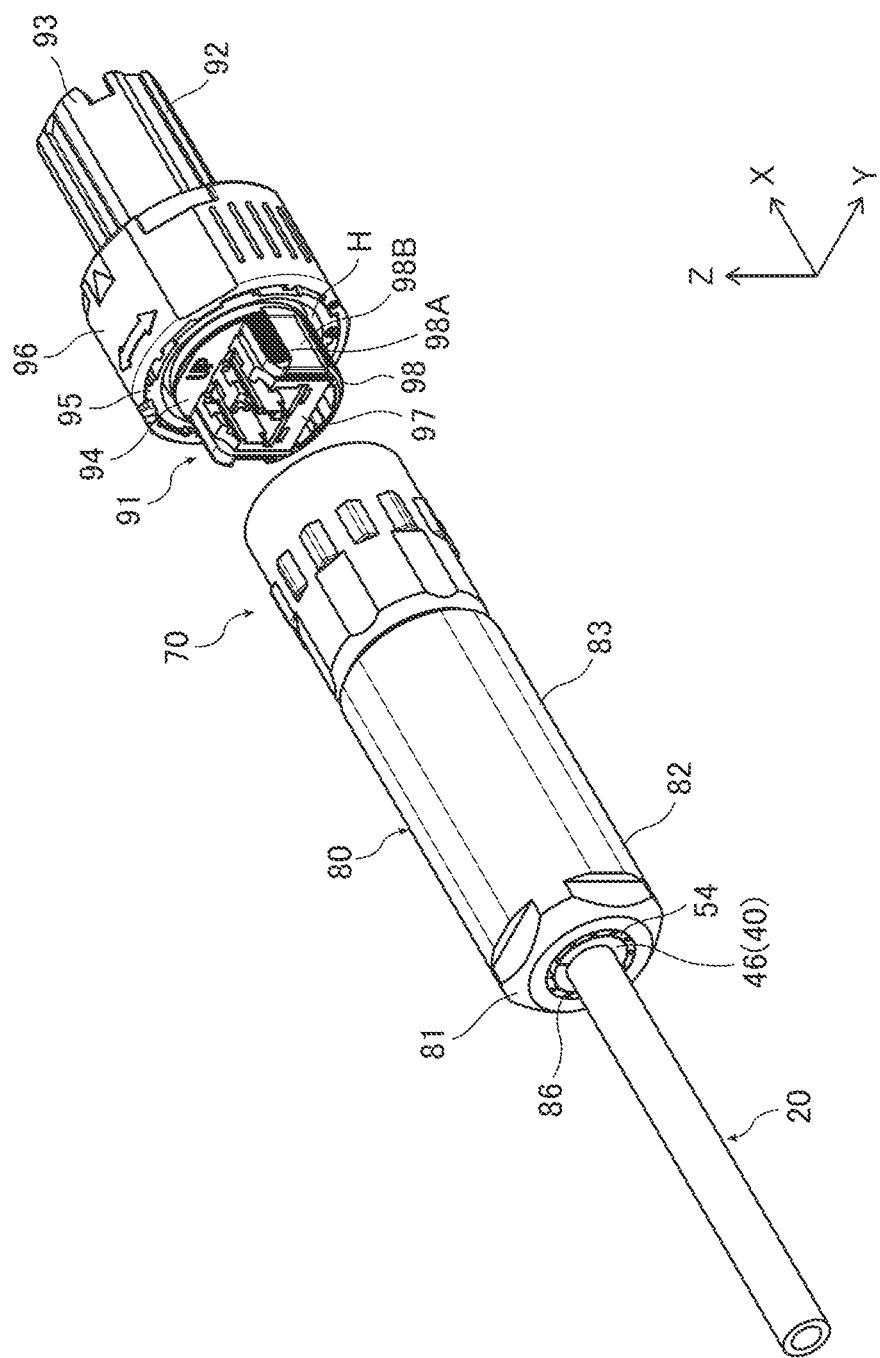
FIG. 6 is a perspective view showing the optical connector-incorporating plug of FIG. 1 from which an optical module is detached.

As shown in FIGS. 6 and 9, the module-side connector 91 includes a connector portion 97 connected with the optical connector 30 and a shell portion 98 accommodating the connector portion 97. The connector portion 97 includes a fitting hole into which the optical connector 30 of duplex type is inserted and fitted and cut-outs which are provided above the fitting hole and into which the latch pieces 36 are inserted.

The shell portion 98 has a semi-cylindrical shape that opens upward, and the outer peripheral surface of the shell portion 98 is provided with the module-side screw portion 98A shown in FIGS. 6 and 9. As shown in FIGS. 6 and 9, the shell portion 98 is provided with insertion grooves 98B formed in such a manner that the outer peripheral surface of the shell portion 98 is dented radially inward at positions corresponding to the protruding piece portions 64 of the end bell 60 in the circumferential direction of the shell portion 98. The insertion grooves 98B extend in the X direction, and similarly to the protruding piece portions 64, three insertion grooves 98B are provided at 90 degree intervals in the circumferential direction of the shell portion 98.

The coupling nut 70 is slid up to the position where it surrounds the module-side connector 91 as shown in FIG. 5, and the module-side screw portion 98A is mated with the nut threaded portion 72, whereby the coupling nut 70 and the optical module 90 are coupled together and the end bell 60 is joined to the optical module 90. In this process, the protruding piece portions 64 of the end bell 60 are inserted into the corresponding insertion grooves 98B (see FIG. 18). Thus, the end bell 60 is adjusted in position in the circumferential direction, and turning of the end bell 60 with respect to the optical module 90 is restricted.

The module body 92 receives an optical signal from the optical connector 30 via the module-side connector 91, converts the optical signal to an electric signal, and outputs the electric signal. The module body 92 is accommodated in a space surrounded by the cover portion 93 and an internal space of the first cylindrical portion 94. The cover portion 93 has a half-polygonal tubular shape that opens downward and extends toward the +X side. The base portion of the cover portion 93 is joined to the front end of the first cylindrical portion 94 in the X direction. The first cylindrical portion 94 has a cylindrical shape with the direction of its central axis being the X direction and is situated anterior to the module-side connector 91. O-ring accommodating grooves 94A and 94B are formed near the front end and the rear end of the first cylindrical portion 94 on the outer peripheral surface of the first cylindrical portion 94, respectively, and O-rings 204 and 205 are disposed in the O-ring accommodating grooves 94A and 94B, respectively.

The second cylindrical portion 95 is a portion surrounding the first cylindrical portion 94 and has a cylindrical shape with the direction of its central axis being the X direction. The inner diameter of the second cylindrical portion 95 is slightly larger than the outer diameter of the first cylindrical portion 94. That is, the annular gap H is formed between the inner peripheral surface of the second cylindrical portion 95 and the outer peripheral surface of the first cylindrical portion 94 as shown in FIGS. 6 to 9, and the front end portion of the coupling nut 70 is inserted into the gap H as shown in FIGS. 4 and 5. As shown in FIGS. 4 and 5, the aforementioned O-ring 204 contacts the inner peripheral surface of the front end portion of the coupling nut 70 inserted in the gap H.

As shown in FIGS. 6 and 9, the outer tubular portion 96 is a portion surrounding the second cylindrical portion 95 and has a substantially cylindrical shape with the direction of its central axis being the X direction. The first cylindrical portion 94 and the second cylindrical portion 95 are disposed in the outer tubular portion 96 and thereby adjusted in position, and are held by the outer tubular portion 96.

[Regarding Method of Manufacturing Optical Connector-Incorporating Plug]

As a method of manufacturing the optical connector-incorporating plug 10 described above, the procedures for assembling the components of the optical connector-incorporating plug 10 are described by reference to FIGS. 13 to 20.

First, there is prepared the optical cable 20 with the optical fiber (the optical fiber extra portion 24) being taken out from the cable end portion 22 and the optical connector 30 being attached to the distal end of the optical fiber, and as shown in FIG. 13, the optical cable 20 is, from the side where the optical connector 30 is attached, passed through the opening 86 at the rear end of the gland nut 80. Thus, the optical connector 30, the optical fiber extra portion 24 and the cable end portion 22 are passed through the gland nut 80 (see FIG. 14).

Next, as shown in FIG. 14, the clamp 50 is positioned such that the tubular portion 52 is situated on the +X side of the rear extending portions 54, and the optical cable 20 is, from the side where the optical connector 30 is attached, passed through the clamp 50. Thereafter, the bushing 40 is positioned such that the front portion 45 is situated on the +X side of the rear portion 46, and the optical cable 20 is, from the side where the optical connector 30 is attached, inserted into the insertion hole 42 of the bushing 40. Thus, the optical connector 30 and the optical fiber extra portion 24 are passed through the clamp 50 and further passed through the bushing 40 via the insertion hole 42 (see FIG. 15).

Next, as shown in FIG. 15, the end bell 60 inserted in the coupling nut 70 is positioned such that the protruding piece portions 64 are situated on the +X side of the rear end portion 62 and the trunk portion 63, and the optical cable 20 is, from the side where the optical connector 30 is attached, introduced into the end bell 60 via the open rear end of the end bell 60. Thus, the optical connector 30 and the optical fiber extra portion 24 enter the internal space 61 of the end bell 60.

Thereafter, the end bell 60 is, along with the coupling nut 70, moved toward the −X side. Thus, as shown in FIG. 16, the optical connector 30 and the distal end portion of the optical fiber extra portion 24 are passed through the internal space 61 of the end bell 60 and positioned on the +X side of the end bell 60 and the coupling nut 70.

Figure 17:
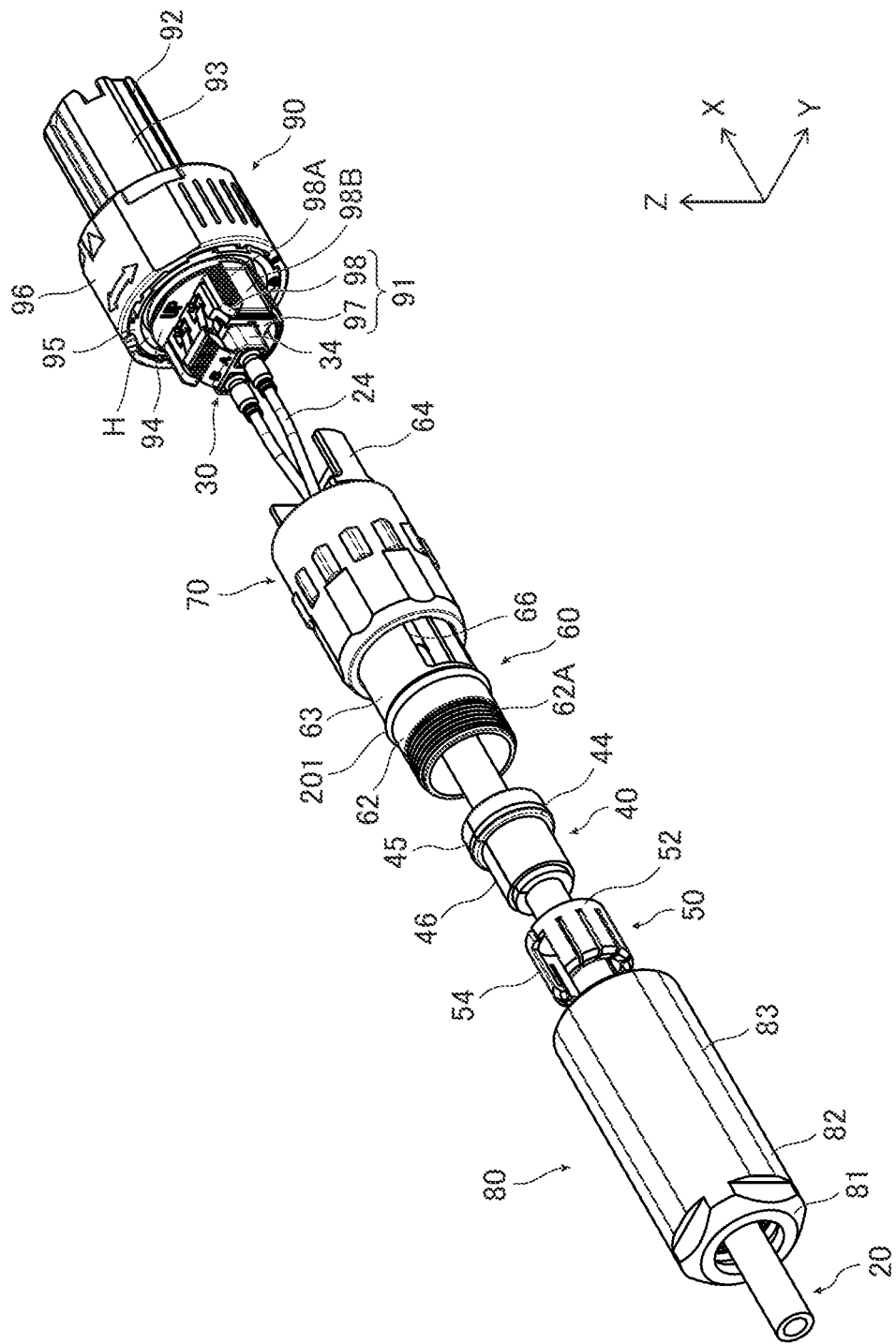
FIG. 17 is a perspective view for showing the assembly procedures of the optical connector-incorporating plug of FIG. 1, particularly a fifth stage of the assembly operation.

Next, as shown in FIG. 17, the optical connector 30 is inserted into and connected to the module-side connector 91 (specifically, the connector portion 97) of the optical module 90. More specifically, the duplex optical connector 30 is inserted and fitted into the fitting hole of the connector portion 97, and the latch pieces 36 are inserted into the cut-outs provided above the fitting hole. Thereafter, as shown in FIG. 18, the end bell 60 is moved toward the +X side, and each of the three protruding piece portions 64 of the end bell 60 are inserted into the corresponding insertion groove 98B in the shell portion 98 of the optical module 90. At this stage, the optical connector 30 and the distal end portion of the optical fiber extra portion 24 enter and are accommodated in the internal space 61 of the end bell 60.

Next, as shown in FIG. 19, the coupling nut 70 is slid toward the +X side on the outer peripheral surface of the trunk portion 63 of the end bell 60. Thus, the front end portion of the coupling nut 70 enters the annular gap H formed between the inner peripheral surface of the second cylindrical portion 95 and the outer peripheral surface of the first cylindrical portion 94 in the optical module 90.

Thereafter, when the coupling nut 70 is further moved toward the +X side, the nut threaded portion 72 formed in the inner peripheral surface of the coupling nut 70 overlaps the module-side screw portion 98A of the optical module 90. In this state, the coupling nut 70 is moved toward the +X side while being turned about the central axis whereby the coupling nut 70 is screwed with respect to the optical module 90. Thus, the end bell 60 is joined to the optical module 90 via the coupling nut 70.

The coupling nut 70 is screwed with respect to the optical module 90 up to the position where the edge of the rear end opening of the coupling nut 70 abuts the step 67 of the outer peripheral surface of the end bell 60. With the edge of the rear end opening of the coupling nut 70 abutting the step 67, the O-ring 203 attached to the end bell 60 contacts a region near the rear end of the coupling nut 70 on the inner peripheral surface of the coupling nut 70. Thus, a gap between the inner peripheral surface of the coupling nut 70 and the outer peripheral surface of the trunk portion 63 is sealed by the O-ring 203.

Next, as shown in FIG. 20, the bushing 40 and the clamp 50 are fitted and press-fitted into the end bell 60 from the open rear end of the end bell 60. More specifically, the rear portion 46 of the bushing 40 is inserted into the clamp 50 from the tubular portion 52 side such that the front end of the clamp 50 abuts the step 44 of the bushing 40, thus assembling the clamp 50 to the bushing 40. Thereafter, the bushing 40 assembled with the clamp 50 is, from the front portion 45 side, fitted and lightly press-fitted into the end bell 60.

The bushing 40 is press-fitted up to the position where the front end of the bushing 40 abuts the step 65 of the inner peripheral surface of the end bell 60. During press-fitting of the bushing 40, at least one of the cable end portion 22 and the optical fiber extra portion 24 in the end bell 60 is checked through the hole 66 formed at the trunk portion 63 (peripheral wall) of the end bell 60. In the embodiment, since the hole 66 is elongated in the X direction, it is possible to check both the cable end portion 22 and the optical fiber extra portion 24 through the hole 66 in the state where the bushing 40 is press-fitted up to the position where the front end of the bushing 40 abuts the step 65.

Here, checking the cable end portion 22 and the optical fiber extra portion 24 refers to checking a fixed position of the cable end portion 22, the length and bending of the optical fiber extra portion 24 (in other words, bending of the optical fiber), and the like.

Finally, the gland nut 80 is mounted to the end bell 60 from the rear end side of the end bell 60. More specifically, the gland nut 80 is moved toward the +X side up to the position where the threaded portion 85 provided in the inner peripheral surface of the gland nut 80 overlaps the rear end screw portion 62A provided in a rear end region on the outer peripheral surface of the end bell 60. Thereafter, the gland nut 80 is further moved toward the +X side while being turned about the central axis whereby the gland nut 80 is screwed with respect to the end bell 60. Thus, the gland nut 80 is fastened to the rear end portion 62 of the end bell 60.

When the gland nut 80 is completely screwed with respect to the end bell 60, of the inner peripheral surface of the bottom portion 81 of the gland nut 80, a region whose inner diameter decreases toward the rear end compresses the rear portion 46 of the bushing 40 radially inward via the rear extending portions 54 of the clamp 50. Consequently, the rear end portion 46 elastically deforms and narrows so as to be closely attached to the optical cable 20, whereby the optical cable 20, the bushing 40 and the clamp 50 are fixed with respect to the end bell 60.

In the stage of screwing the gland nut 80 with respect to the end bell 60, since fitting (press-fitting) of the bushing 40 into the end bell 60 is already completed, screwing of the gland nut 80 does not cause any shift in position of the bushing 40, any change in the length of the optical fiber extra portion 24, or the like.

The gland nut 80 is screwed up to the position where the front end of the gland nut 80 abuts the rear end of the coupling nut 70. In the state where the front end of the gland nut 80 abuts the rear end of the coupling nut 70, each of the rear end portion 62 and the trunk portion 63 of the end bell 60 is surrounded by the extending portion 83 of the gland nut 80 as shown in FIGS. 4, 5, 7 and 8. That is, when the gland nut 80 is mounted to the end bell 60, the hole 66 at the trunk portion 63 is covered with the extending portion 83.

Further, when the gland nut 80 is mounted to the end bell 60, the two O-rings 201 and 202 attached to the outer peripheral surface of the trunk portion 63 of the end bell 60 contact the inner peripheral surface of the gland nut 80 (specifically, the inner peripheral surface of the extending portion 83) as shown in FIGS. 4, 5, 7 and 8. That is, the two O-rings 201 and 202 are disposed in the gap G between the outer peripheral surface of the trunk portion 63 and the inner peripheral surface of the extending portion 83 to seal the gap G. In the embodiment, the O-rings 201 and 202 are arranged to sandwich the hole 66 therebetween in the X direction; that is, the O-ring 201 is disposed immediately posterior to the hole 66, while the O-ring 202 is disposed immediately anterior to the hole 66. With this configuration, a water and dust proof structure is built near the hole 66, and this makes it possible to effectively prevent water, foreign matter and the like from entering the end bell 60 through the hole 66.

Figure 2:
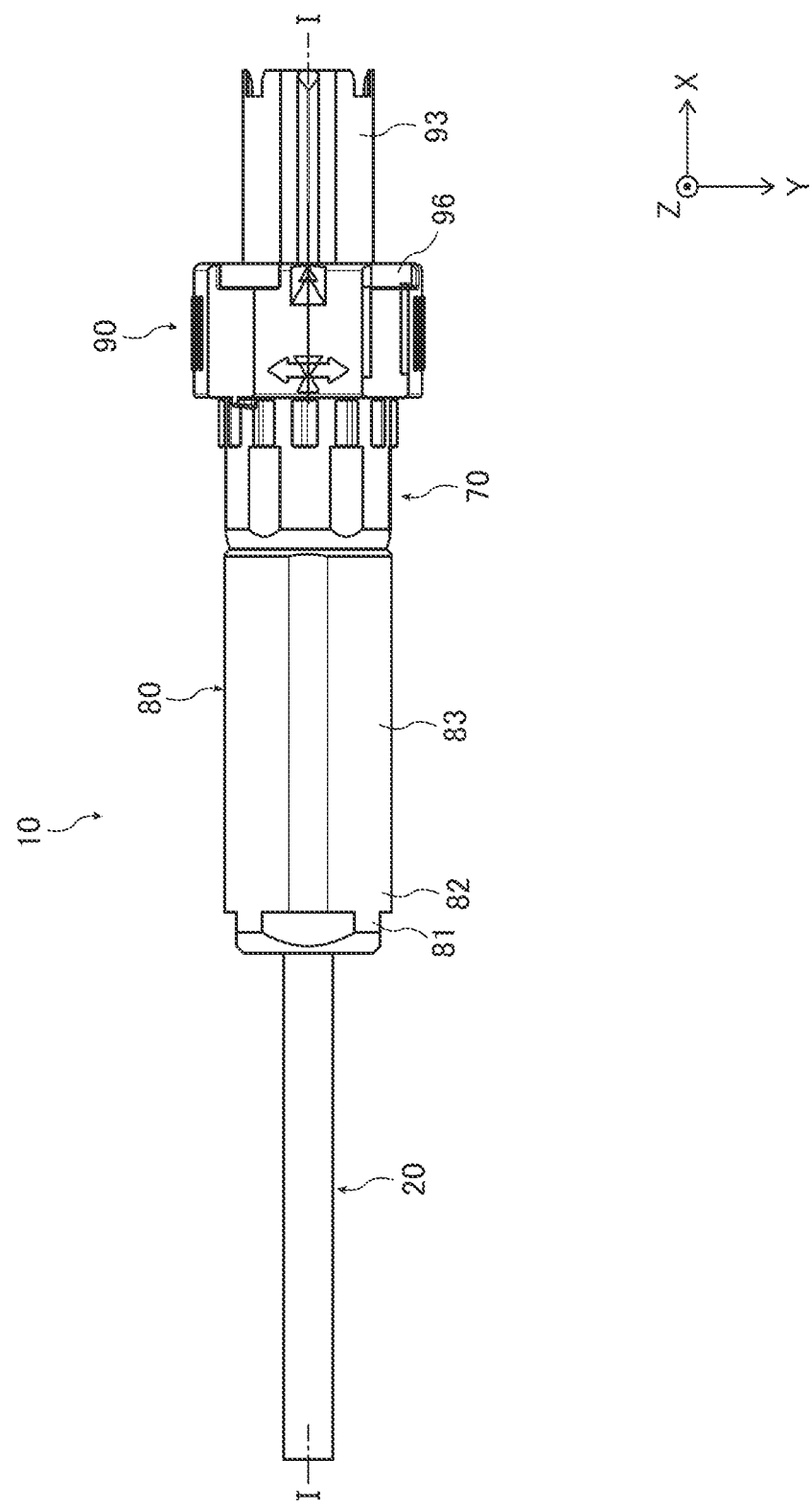
FIG. 2 is a plan view of the optical connector-incorporating plug according to the embodiment of the invention.
Figure 3:
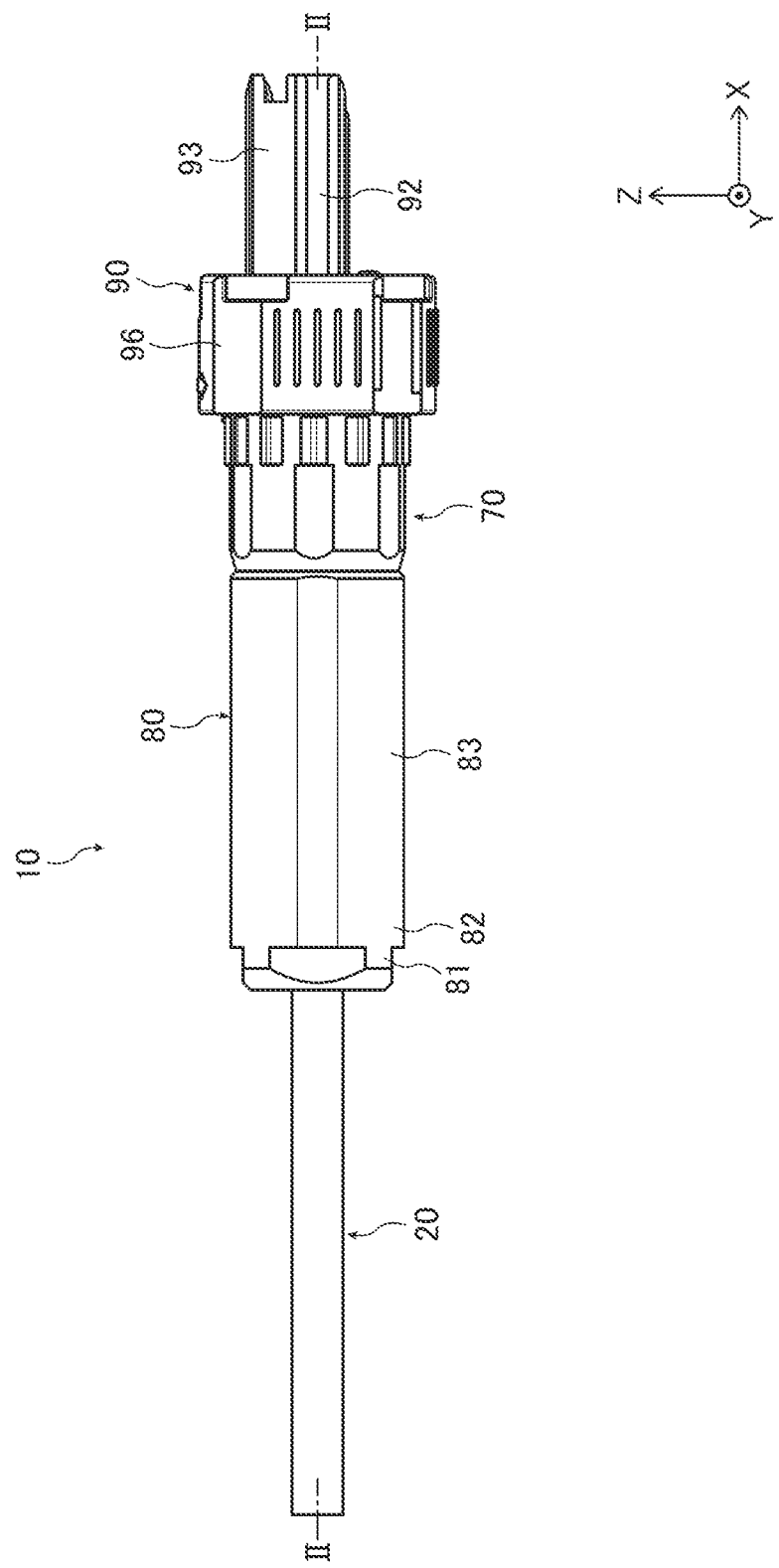
FIG. 3 is a side view of the optical connector-incorporating plug according to the embodiment of the invention.

The optical connector-incorporating plug 10 shown in FIGS. 1 to 3 is completed through a series of steps described above.

As described above, in the embodiment, the hole 66 is provided at the trunk portion 63 of the end bell 60. Therefore, in assembling the optical connector-incorporating plug 10, it is possible to fit the bushing 40 into the end bell 60 while checking the cable end portion 22 and the optical fiber extra portion 24 in the end bell 60 through the hole 66. Hence, the length and the bending amount of the optical fiber extra portion 24 in the end bell 60 can be maintained constant.

Figure 22:
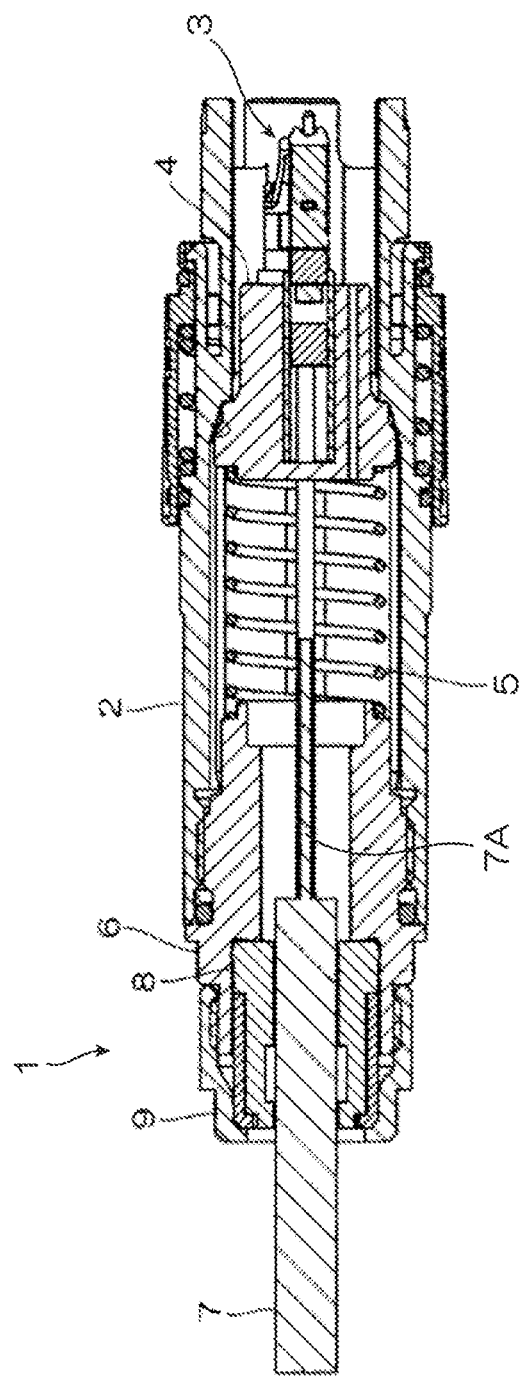
FIG. 22 is a cross-sectional view of a conventional optical connector-incorporating plug.

To be more specific, in the case of a conventional article such as the optical connector-incorporating plug 1 shown in FIG. 22, in an assembly process, when a bushing having an optical cable inserted therein through an insertion hole is press-fitted into a cylindrical member (corresponding to the stopper 6 in FIG. 22), the fixed position of the optical cable is sometimes shifted. When the fixed position of the optical cable is shifted, the length of the optical cable introduced into the cylindrical member, more precisely, the bending amount of an optical fiber (optical fiber extra portion) taken out from an end portion of the optical cable varies from a specified value. Therefore, an optical transmission loss may fluctuate in a conventional optical connector-incorporating plug.

Figure 21:
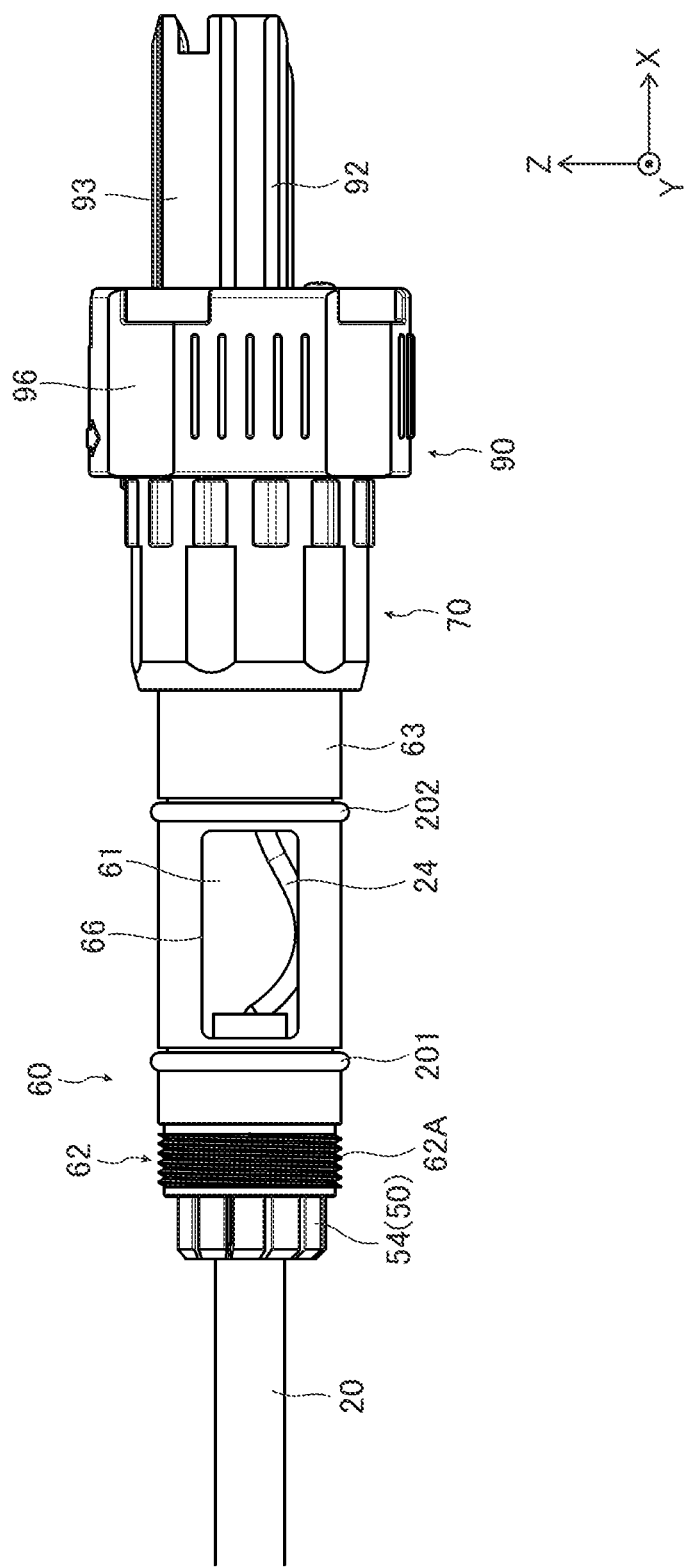
FIG. 21 is an enlarged partial view of a region around a hole in a tubular member, for showing the state where a bending amount of an optical fiber extra portion has changed.

As for the optical connector-incorporating plug 10 according to the embodiment, it is possible to fit the bushing 40 into the end bell 60 while checking the cable end portion 22 and the optical fiber extra portion 24 in the end bell 60 through the hole 66 as described above. Owing to this configuration, even if the position of the optical cable 20 is shifted upon fitting of the bushing 40 into the end bell 60 and the bending amount of the optical fiber extra portion 24 changes, the change in the bending amount of the optical fiber extra portion 24 can be visually checked through the hole 66 as shown in FIG. 21. In this case, the bushing 40 is refitted into the end bell 60 to correct the cable position, whereby the bending amount of the optical fiber extra portion 24 can be adjusted to a certain amount. Accordingly, fluctuations in the optical transmission loss can be minimized.

In the optical connector-incorporating plug 1 shown in FIG. 22, it is necessary to form a hole in each of the stopper 6 and the outer shell member 2 surrounding the stopper 6 in order to check the position of the end portion of the optical cable 7 and the bending amount of the optical fiber 7A during press-fitting of the bushing 8 into the stopper 6, as can be understood from FIG. 22. However, portions where such holes are to be formed have a screw portion provided to couple the stopper 6 to the outer shell member 2 and an O-ring disposed to seal a gap between the stopper 6 and the outer shell member 2. Therefore, it is practically difficult to provide the optical connector-incorporating plug 1 shown in FIG. 22 with such holes used to check the optical cable 7 and the optical fiber 7A.

Aside from that, in the completed optical connector-incorporating plug 10, the hole 66 is covered with the gland nut 80. This configuration makes it possible to prevent water and foreign matter such as dust from entering the end bell 60 through the hole 66. This configuration is effective particularly when, for instance, the optical connector-incorporating plug 10 is used outdoors.

In the embodiment, the gland nut 80 of cylindrical shape elongated in the direction of the central axis is used, and the gland nut 80 surrounds the peripheral wall of the end bell 60 over a wide range in the X direction when mounted to the end bell 60. Owing to this configuration, the entire hole 66 is reliably covered with the gland nut 80. In the embodiment, since the hole 66 is elongated in the X direction, the gland nut 80 capable of surrounding the end bell 60 over a wide range in the X direction is particularly effective.

Further, the O-rings 201 and 202 sealing the gap G between the inner peripheral surface of the gland nut 80 and the outer peripheral surface of the end bell 60 are provided near the hole 66, thus preventing water and foreign matter such as dust from entering the end bell 60 through the hole 66 more effectively.

In the embodiment, since the hole 66 is situated between the two O-rings 201 and 202 in the X direction, it is possible to prevent entry of water and foreign matter through the hole 66 more effectively. The configuration as above is effective particularly when the gland nut 80 of cylindrical shape elongated in the direction of the central axis is used, that is, when the gap G elongated in the X direction is formed.

Other Embodiments

While the optical connector-incorporating plug and the manufacturing method thereof according to the present invention are described above, the foregoing embodiment is merely an example, and other embodiments are also applicable.

While the optical connector-incorporating plug having the optical module 90 is described in the foregoing embodiment, the invention is not limited thereto, and there may be employed the configuration in which an optical connector is directly connected to an adapter of a receptacle without the optical module 90. For example, there may be used the configuration in which an inner housing that holds an optical connector and a spring that urges the inner housing forward are accommodated in an end bell, and the optical connector being urged forward is connected to an adapter of a receptacle.

In the foregoing embodiment, the end bell 60 is described as one example of the cylindrical member, and the hole 66 is provided at the peripheral wall of the end bell 60. However, the cylindrical member is not limited to the end bell 60, and any component may be used as long as it accommodates an end portion of an optical cable and an optical fiber extra portion therein and receives the bushing 40 fitted (press-fitted) therein. If a hole is provided at a peripheral wall of that component, then the effect of the invention can be obtained.

In the foregoing embodiment, the hole 66 provided at the end bell 60 is elongated in the X direction. Accordingly, it is possible to check both the cable end portion 22 and the optical fiber extra portion 24 in the end bell 60 through the hole 66 during fitting of the bushing 40 into the end bell 60. However, the invention is not limited thereto, and the hole 66 may have a size with which at least one of the cable end portion 22 and the optical fiber extra portion 24 is seeable through the hole. In this case, the hole 66 may be provided at a position where the cable end portion 22 can be checked, but is more preferably provided at a position where the optical fiber extra portion 24 can be checked. Moreover, it is particularly preferable to provide the hole 66 at a position where both the cable end portion 22 and the optical fiber extra portion 24 can be checked as in the foregoing embodiment.

The invention claimed is:

1. A method of manufacturing an optical connector-incorporating plug, comprising:
   a step of inserting an optical cable into an insertion hole of a cable insertion component with an optical fiber being taken out from a cable end portion of the optical cable, and putting the cable end portion and the optical fiber into a tubular member;
   a step of fitting the cable insertion component into the tubular member while checking at least one of the cable end portion and the optical fiber in the tubular member through a hole formed at a peripheral wall of the tubular member;
   a step of mounting a surrounding member to the tubular member to thereby cover the hole, the surrounding member being configured to surround at least a part of the peripheral wall of the tubular member; and
   a step of disposing a plurality of seal members in a gap between an outer peripheral surface of the tubular member and an inner peripheral surface of the surrounding member to seal the gap over a whole circumference of the outer peripheral surface of the tubular member,
   wherein in the step of disposing the plurality of seal members, the plurality of seal members are situated away from each other in a direction of a central axis of the tubular member so that the hole is situated between the plurality of seal members in the direction of the central axis of the tubular member.

2. An optical connector-incorporating plug comprising:
   a cable insertion component having an insertion hole in which an optical cable is inserted with an optical fiber being taken out from a cable end portion of the optical cable;
   a tubular member in which the cable end portion and the optical fiber are placed and in which the cable insertion component is fitted;
   a hole formed at a peripheral wall of the tubular member at a position where at least one of the cable end portion and the optical fiber in the tubular member is seeable through the hole; and
   a surrounding member mounted to the tubular member to surround at least a part of the peripheral wall of the tubular member and thereby cover the hole; and
   a plurality of seal members disposed in a gap between an outer peripheral surface of the tubular member and an inner peripheral surface of the surrounding member to seal the gap over a whole circumference of the outer peripheral surface of the tubular member,
   wherein the plurality of seal members are situated away from each other in a direction of a central axis of the tubular member, and the hole is situated between the plurality of seal members in the direction of the central axis of the tubular member.

3. The optical connector-incorporating plug according to claim 2,
   wherein each of the plurality of seal members is an O-ring disposed in an accommodating groove formed in the outer peripheral surface of the tubular member.

4. The optical connector-incorporating plug according to claim 2,
   wherein the hole formed at the tubular member is limited to just one hole, and
   the plurality of seal members are two O-rings.

5. The optical connector-incorporating plug according to claim 2,
   wherein the cable insertion component is a bushing fitted into the tubular member from an open rear end of the tubular member,
   the surrounding member is a gland nut fastened to a rear end portion of the tubular member, and
   the bushing and the optical cable are fixed with respect to the tubular member by fastening the gland nut to the rear end portion of the tubular member.

6. The optical connector-incorporating plug according to claim 5,
   wherein the gland nut has a fastening portion fastened to the rear end portion of the tubular member and an extending portion in a tubular shape extending forward from the fastening portion, and
   in a state where the fastening portion is fastened to the rear end portion of the tubular member, the extending portion faces the hole, and a front end of the extending portion is situated anterior to the hole.

7. The optical connector-incorporating plug according to claim 6,
   wherein the extending portion is constituted of a peripheral wall having a tubular shape.

8. The optical connector-incorporating plug according to claim 2,
   wherein the hole extends along a direction of a central axis of the tubular member.

9. The optical connector-incorporating plug according to claim 2, including:

an optical connector attached to a distal end of the optical fiber taken out from the cable end portion; and an optical module into which the optical connector is inserted, whereby the optical module is connected to the optical connector.

* * * * *